(12) United States Patent
Schwiesow

(10) Patent No.: US 10,838,049 B1
(45) Date of Patent: Nov. 17, 2020

(54) CALIBRATION PROCEDURE FOR ESTABLISHING AN EXTRINSIC RELATIONSHIP BETWEEN LIDAR AND CAMERA SENSORS

(71) Applicant: The Boeing Company, Chicago, IL (US)

(72) Inventor: Michael B. Schwiesow, Madison, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/717,953

(22) Filed: Dec. 17, 2019

(51) Int. Cl.
| | |
|---|---|
| *G01S 7/497* | (2006.01) |
| *G01S 7/51* | (2006.01) |
| *G06F 17/17* | (2006.01) |
| *G06F 3/0484* | (2013.01) |
| *G06T 7/80* | (2017.01) |

(52) U.S. Cl.
CPC ............. *G01S 7/4972* (2013.01); *G01S 7/51* (2013.01); *G06F 3/0484* (2013.01); *G06F 17/17* (2013.01); *G06T 7/80* (2017.01)

(58) Field of Classification Search
CPC . G06T 7/80; G01S 7/51; G06F 3/0484; G06F 17/17
See application file for complete search history.

(56) References Cited

U.S. PATENT DOCUMENTS

| | | | |
|---|---|---|---|
| 2011/0205186 A1* | 8/2011 | Newton | G06F 3/017 345/175 |
| 2019/0204425 A1* | 7/2019 | Abari | G01S 17/931 |

OTHER PUBLICATIONS

Park et al.; "Calibration between Color Camera and 3D LIDAR Instruments with a Polygonal Planar Board"; Sensors ISSN 1424-8220; pp. 5333-5353; 2014.

(Continued)

*Primary Examiner* — Edward Park
(74) *Attorney, Agent, or Firm* — Haynes & Boone, LLP

(57) ABSTRACT

In one or more embodiments, a method for calibration between a lidar sensor and a camera comprises determining translation parameters of extrinsic calibration parameters by using a location of the camera with respect to the lidar sensor. The method further comprises orienting a target chessboard such that it is aligned with axes of a lidar coordinate system. Also, the method comprises optimizing a best fit transformation between a camera coordinate system and a target chessboard coordinate system. In addition, the method comprises determining a rotation matrix using the best fit transformation between the camera coordinate system and the target chessboard coordinate system. Additionally, the method comprises extracting Euler angles of the extrinsic calibration parameters from the rotation matrix. Also, the method comprises collecting, by the lidar sensor and the camera, calibration scenes using the target chessboard. Further, the method comprises optimizing the extrinsic calibration parameters by using the calibration scenes.

20 Claims, 26 Drawing Sheets

(56) References Cited

OTHER PUBLICATIONS

Pandey et al.; "Automatic Extrinsic Calibration of Vision and Lidar by Maximizing Mutual Information"; Electrical Engineering: Systems—University of Michigan; 33 pages; 2012.
Storn et al.; "Differential Evolution—A Simple and Efficient Heuristic for Global Optimization over Continuous Spaces"; Journal of global Optijmization 11: pp. 341-359, 1997.
Zhang; "A Flexible New technique for Camera Calibration"; http://research.microsoft.com/~zhang; 22 pages; 1998.
ROS Camera Calibration Documentation, http://wiki.ros.org/camera_calibration; Jun. 5, 2017; 3 pages.

\* cited by examiner

Parent Directory - /opt/caravan/test
Lidar Topic - None — 411
Select Lidar
/vlp32_right/velodyne_points
/vlp32_left/velodyne_points Camera and Intrinsics - None
Initial Pose
Collect Data
Calibrate

Parent Directory - /opt/caravan/test
Lidar Topic - vlp32_right/velodyne_points
Camera and Intrinsics - /right_eth_cam_nose/image_raw
Initial Pose
Collect Data Set Next Scene    Scene Setup(s)    Record For (s)    Number of Scenes    Display Scene 5.0    2.0    40    0

Stop    Record Now

Calibrate

FIG. 4G   *460*

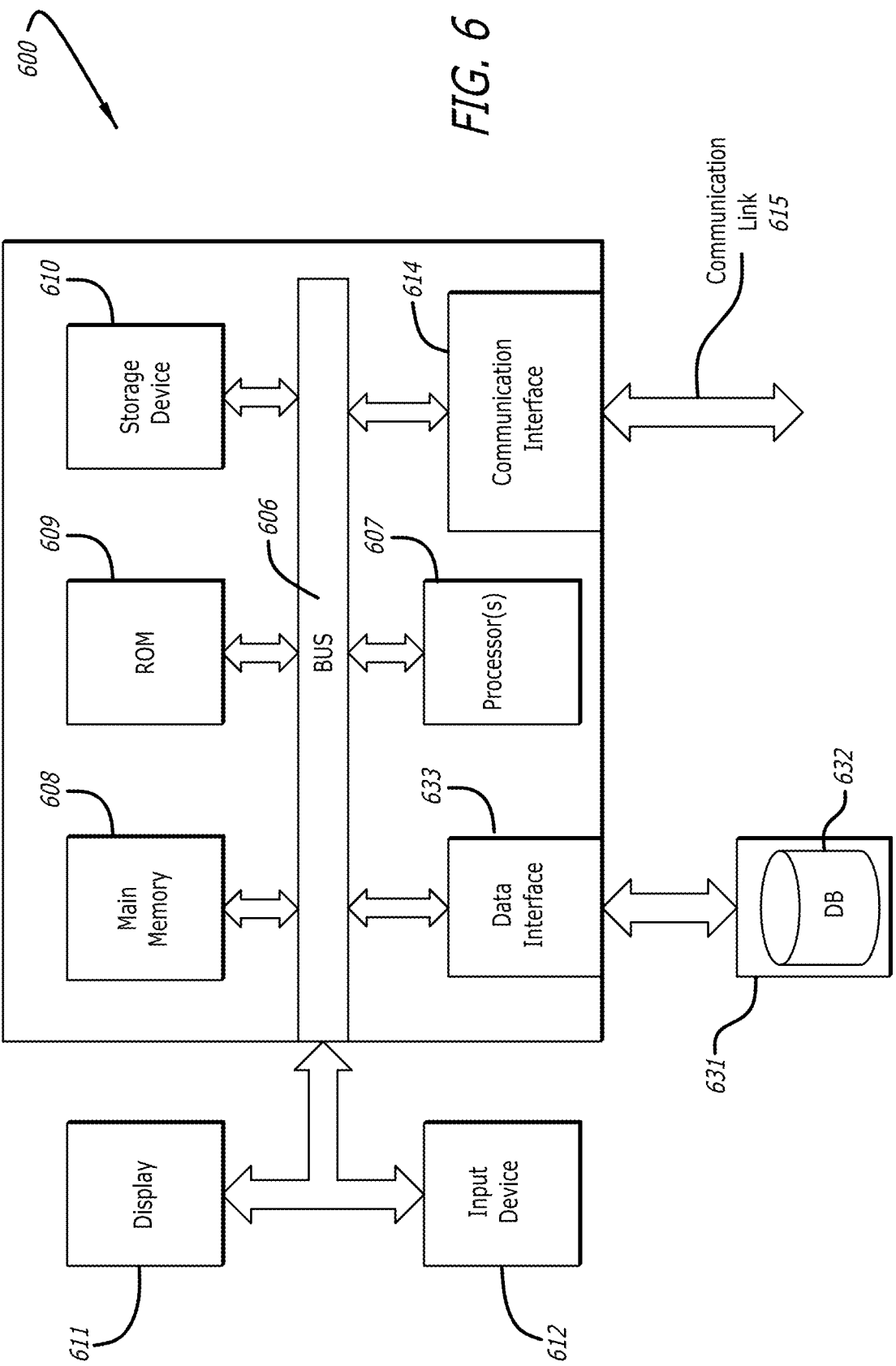

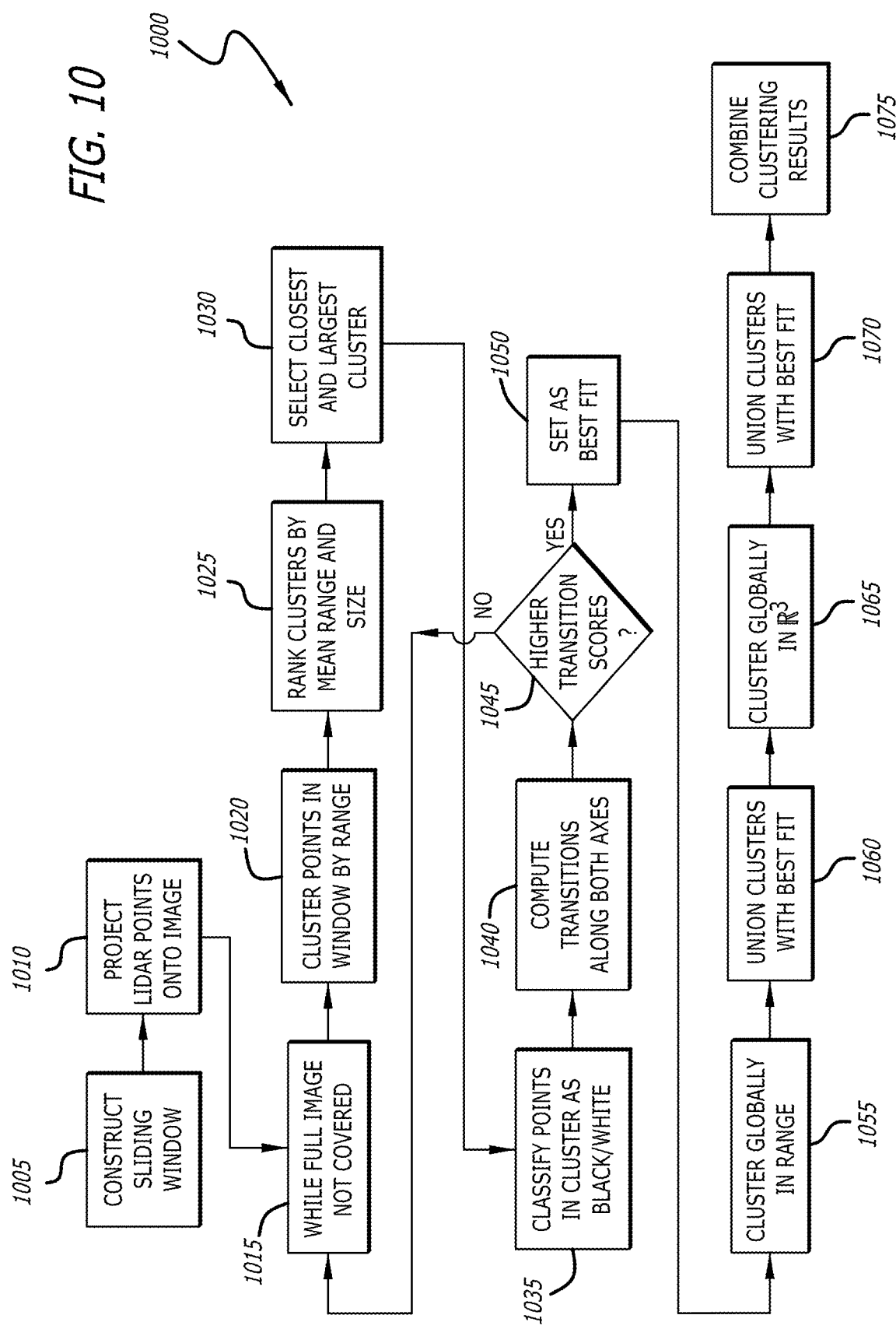

CALIBRATION PROCEDURE FOR ESTABLISHING AN EXTRINSIC RELATIONSHIP BETWEEN LIDAR AND CAMERA SENSORS

FIELD

The present disclosure relates to light detection and ranging (lidar) and camera sensors. In particular, the present disclosure relates to a calibration procedure for establishing an extrinsic relationship between a lidar sensor and a camera.

BACKGROUND

Currently, it is not possible, with existing technology, to successfully navigate autonomously using a single sensor, or even a single sensor modality. Nor does it make sense to use multiple sensors in isolation, particularly when they have been chosen in such a way as to provide complementary strengths. In order to meaningfully fuse the information from multiple sensors, however, it is necessary to first establish them in a common frame of reference. This is accomplished through extrinsic calibration of sensor pairs.

Existing methods require surveying the position and orientation (also referred to as pose), of each sensor by external means in a controlled environment. Typically, the survey will use Metrologic methods to locate each sensor in a common reference frame. These methods are limited by access (e.g., confined space) and line-of-sight constraints to the sensors. These methods may require disassembling some of the platform for access. Some methods may require known calibration targets and other fiducials arranged in meticulously staged scenes. This translates to an expensive and time consuming process which cannot be performed in the field. As the actual sensor poses drift over time and the sensor become misaligned, the platform would have to be pulled from service for a new calibration to be performed.

In light of the foregoing, there is a need for an improved calibration procedure for establishing an extrinsic relationship between a lidar sensor and a camera.

SUMMARY

The present disclosure relates to a method, system, and apparatus for establishing an extrinsic relationship between a lidar sensor and a camera. In one or more embodiments, a method for calibration between a lidar sensor and a camera comprises determining, by at least one processor, translation parameters of extrinsic calibration parameters by using a location of the camera with respect to the lidar sensor. The method further comprises orienting a target chessboard such that the target chessboard is aligned with axes of a lidar coordinate system. Also, the method comprises optimizing, by at least one processor, a best fit transformation between a camera coordinate system and a target chessboard coordinate system. In addition, the method comprises determining, by at least one processor, a rotation matrix using the best fit transformation between the camera coordinate system and the target chessboard coordinate system. In addition, the method comprises extracting, by at least one processor, Euler angles of the extrinsic calibration parameters from the rotation matrix. Additionally, the method comprises collecting, by the lidar sensor and the camera, calibration scenes using the target chessboard. Further, the method comprises optimizing, by at least one processor, the extrinsic calibration parameters by using the calibration scenes.

In one or more embodiments, displaying, on a display, a graphical user interface (GUI). In at least one embodiment, the method further comprises selecting, via the GUI, a parent directory for data curation. In some embodiments, the method further comprises selecting, via the GUI, the lidar sensor and the camera for the calibration. In one or more embodiments, the method further comprises loading, via the GUI, camera intrinsic parameters.

In at least one embodiment, the method further comprises generating camera intrinsic parameters. In one or more embodiments, the method further comprises measuring the location of the camera with respect to the lidar sensor. In some embodiments, the method further comprises imaging, by the camera, the target chessboard to generate an initial image of the target chessboard. In at least one embodiment, the optimizing, by the at least one processor, of the best fit transformation between a camera coordinate system and a target chessboard coordinate system is performed using a Levenberg-Marquardt optimization.

In one or more embodiments, the collecting, by the lidar sensor and the camera, the calibration scenes comprises: transmitting, by the lidar sensor, at least one transmit signal to the target chessboard located at N number of locations from the camera to obtain at least one lidar measurement; and imaging, by the camera, the target chessboard to generate imaging measurements of the target chessboard for each of the N number of locations. In at least one embodiment, at least one transmit signal is an optical signal or an infrared signal.

In at least one embodiment, the optimizing, by at least one processor, of the extrinsic calibration parameters by using the calibration scenes is performed using a differential evolution optimization. In some embodiments, the optimizing, by the at least one processor, of the extrinsic calibration parameters by using the calibration scenes comprises classifying lidar points and camera pixels as black or white.

In one or more embodiments, the optimizing, by the at least one processor, of the extrinsic calibration parameters by using the calibration scenes comprises determining an orientation of the target chessboard. In at least one embodiment, the orientation of the chessboard is a diamond orientation or a rectangular orientation.

In at least one embodiment, a system for calibration between a lidar sensor and a camera comprises a target chessboard. The system further comprises at least one processor to determine translation parameters of extrinsic calibration parameters by using a location of the camera with respect to the lidar sensor, to optimize a best fit transformation between a camera coordinate system and a target chessboard coordinate system, to determine a rotation matrix using the best fit transformation between the camera coordinate system and the target chessboard coordinate system, to extract Euler angles of the extrinsic calibration parameters from the rotation matrix, and to optimize the extrinsic calibration parameters by using calibration scenes collected by the lidar sensor and the camera. Further, the system comprises the lidar sensor and the camera to collect the calibration scenes using the target chessboard.

In one or more embodiments, the system further comprises a display to display a graphical user interface (GUI). In some embodiments, the GUI comprises a selection for a parent directory for data curation. In at least one embodiment, the GUI comprises a selection for the lidar sensor and a selection for the camera. In some embodiments, the GUI comprises a selection for loading camera intrinsic parameters.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 4A to 4H show various different exemplary graphical user interfaces (GUIs) that may be employed by the disclosed system for calibration between a lidar sensor and a camera, in accordance with at least one embodiment of the present disclosure.

FIG. 6 illustrates a block diagram of an illustrative computing system suitable for implementing an embodiment of the present disclosure, in accordance with at least one embodiment of the present disclosure.

FIG. 10 is a block diagram showing the disclosed method for auto-locating the chessboard in a lidar point cloud, in accordance with at least one embodiment of the present disclosure.

Figure 13A:
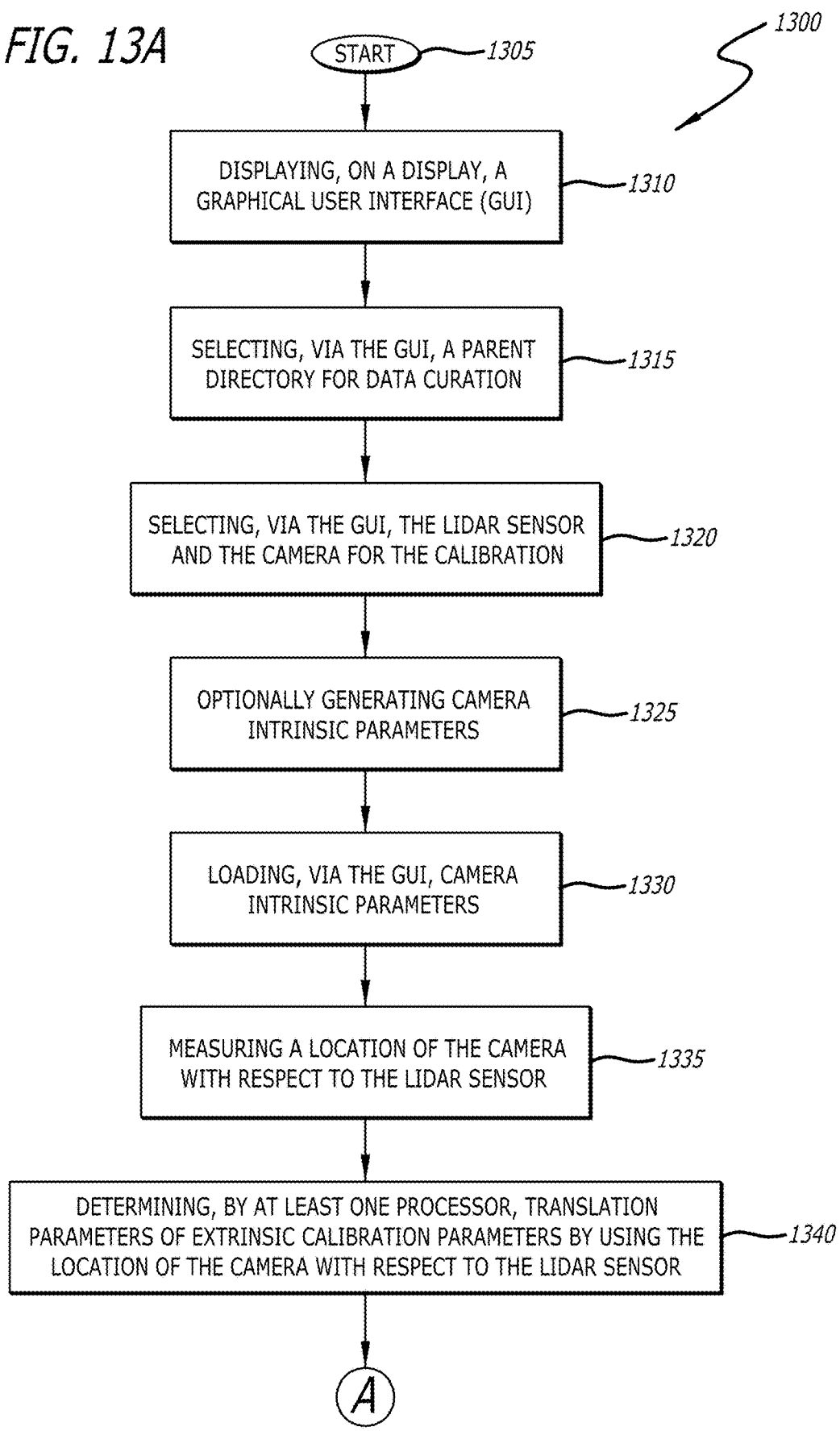
Figure 13B:
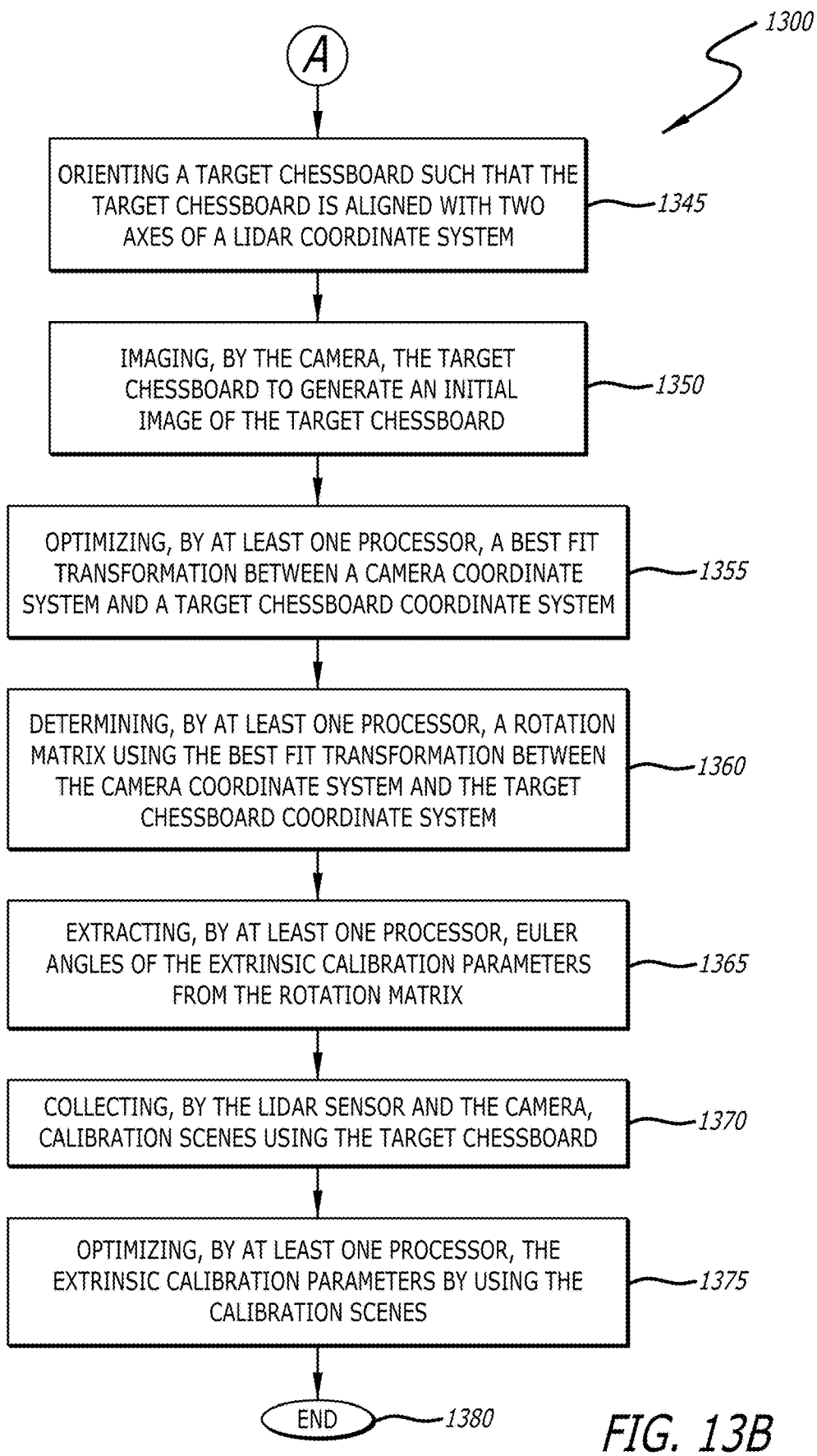

FIGS. 13A and 13B together are a flow chart showing the disclosed method for calibration between a lidar sensor and a camera, in accordance with at least one embodiment of the present disclosure.

Figure 14:
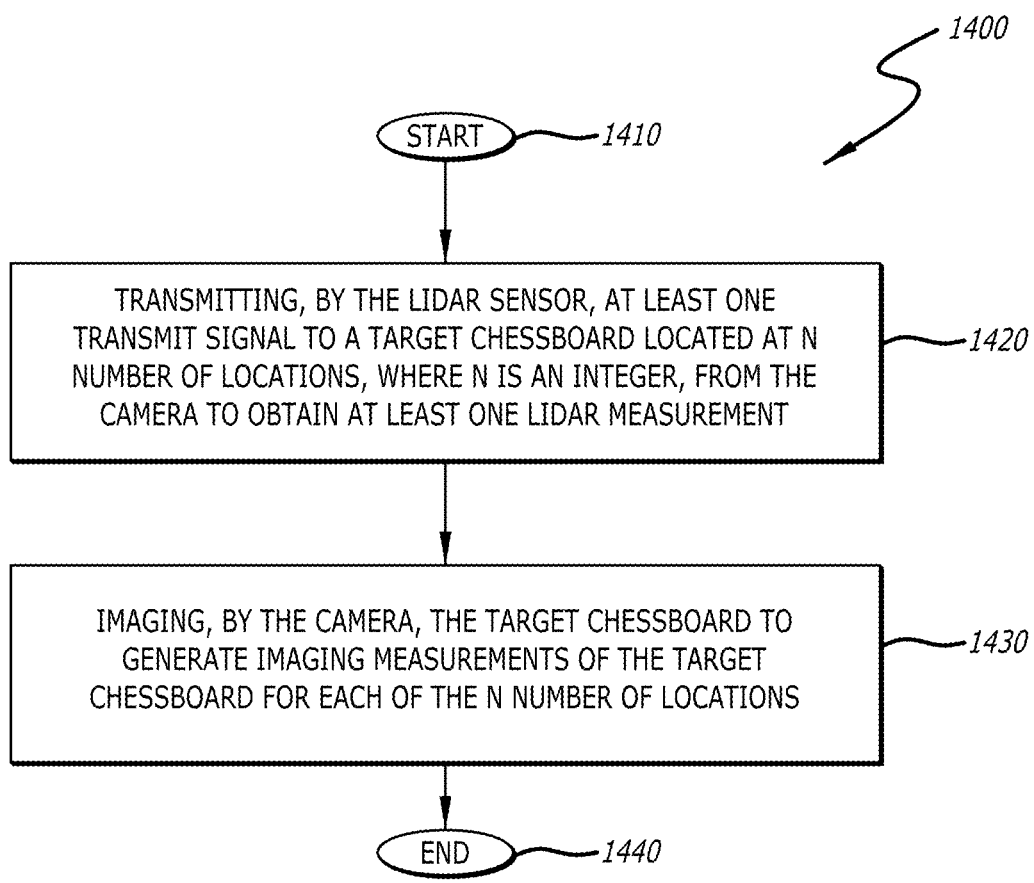

FIG. 14 is a flow chart showing the disclosed method for collecting, by a lidar sensor and a camera, calibration scenes using a target chessboard, in accordance with at least one embodiment of the present disclosure.

DESCRIPTION

The methods and apparatus disclosed herein provide an operative system for establishing an extrinsic relationship between a light detection and ranging (lidar) sensor and a camera. In particular, the system of the present disclosure provides a process for conducting the extrinsic calibration between a three-dimensional (3D) lidar sensor and a camera.

As previously mentioned above, currently, it is not possible, with existing technology, to successfully navigate autonomously using a single sensor, or even a single sensor modality. Nor does it make sense to use multiple sensors in isolation, particularly when they have been chosen in such a way as to provide complementary strengths. In order to meaningfully fuse the information from multiple sensors, however, it is necessary to first establish them in a common frame of reference. This is accomplished through extrinsic calibration of sensor pairs.

The disclosed system provides a solution to the problem of placing two complementary sensor systems (e.g., a 3D lidar and a camera) in a common reference frame so that the information provided by each individually may be fused together to provide a more complete and robust perception of the world for autonomous systems. The disclosed system has the advantage of only requiring a single, simple calibration target (e.g., a planar chessboard) and minimal variation in the calibration scene (such as a person walking across the camera field of view (FOV) with the chessboard). This translates into a procedure which can be performed as necessary, for example, as part of pre-flight maintenance for an aircraft.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to reflectors and detectors, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

I. Design Considerations

It is necessary for the disclosed calibration procedure to be capable of being performed rapidly in the field. Originally, for example for an aircraft, this was necessitated by the fact that all sensing equipment had to be removed prior to flight and reinstalled upon arrival at the destination airport. Once the sensors and mountings are hardened for flight, field calibration will remain a necessity for situations where the pre-taxi check indicates that the sensors have become misaligned. In order to accommodate for this, the calibration procedure must have minimal prerequisites for calibration scene features, and it must allow for rapid construction of a minimal dataset. To this end, the calibration procedure requires a single calibration artifact (i.e. a target) (e.g., a chessboard pattern printed on a planar surface, such as a whiteboard). This single artifact can be used to generate camera intrinsic parameters, an initial estimate of the Euler angles, and a final estimate of the calibration parameters. For example, in one or more embodiments, the chessboard should have at least a three-by-three (3×3) black/white (squares) chessboard pattern, with a minimum square size of 175 millimeters (mm) each, although a larger sized board is desirable. This ensures that for a lidar spinning at three-hundred (300) revolutions per minute (rpm) at five (5) Hertz (Hz), at least five (5) returns will fall (e.g., horizontally) on each square of the chessboard at a range of twelve (12) meters. However, it should be noted that in other embodiments, the chessboard may comprise more or less than a 3×3 black/white chessboard pattern, and/or the chessboard may comprise squares that are less than 175 mm each.

II. Calibration Systems and Methods

Figure 1:
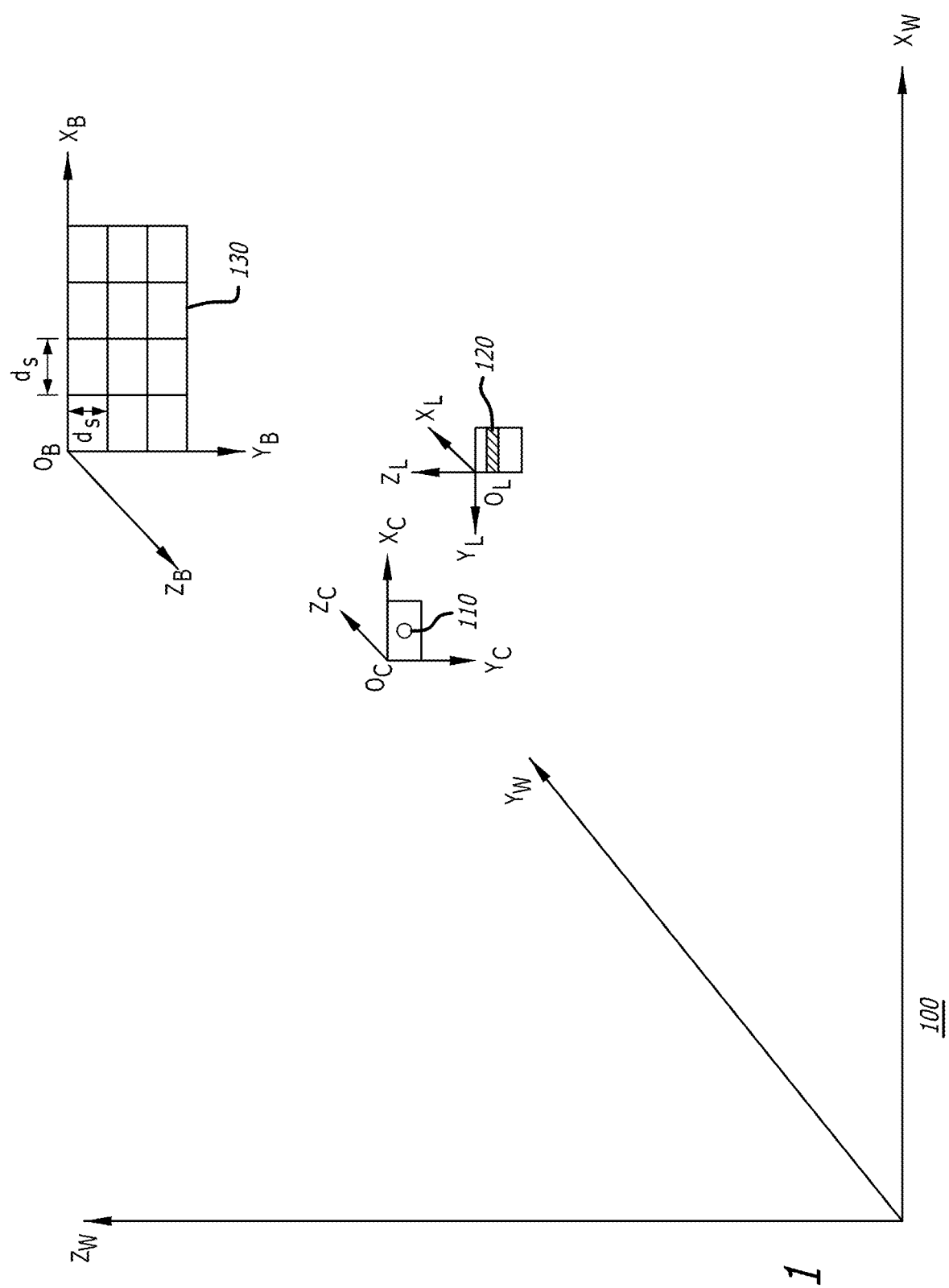
FIG. 1 is a three-dimensional graph illustrating the four coordinate systems for the disclosed system for calibration between a lidar sensor and a camera, in accordance with at least one embodiment of the present disclosure.

FIG. 1 is a three-dimensional graph 100 illustrating the four coordinate systems (coordinate frames) for the disclosed system for calibration between a lidar sensor and a camera, in accordance with at least one embodiment of the present disclosure. In particular, this figure shows a world coordinate system (i.e. an Earth centered inertial, latitude/longitude/altitude, etc.) of $(X, Y, Z)_W$, a self-centered lidar coordinate system of $(X, Y, Z)_L$, a self-centered camera coordinate system of $(X, Y, Z)_C$, and a target (or chessboard) coordinate system centered on an arbitrary corner of the target of $(X, Y, Z)_B$. In addition, FIG. 1 illustrates the camera lens 110 of the camera in the self-centered camera coordinate system, and the emitter/receiver 120 of the lidar in the self-centered lidar coordinate system. Also in FIG. 1, the size of each square of the chessboard 130 in the target coordinate system is shown to be ds in height by ds in width.

Figure 2:
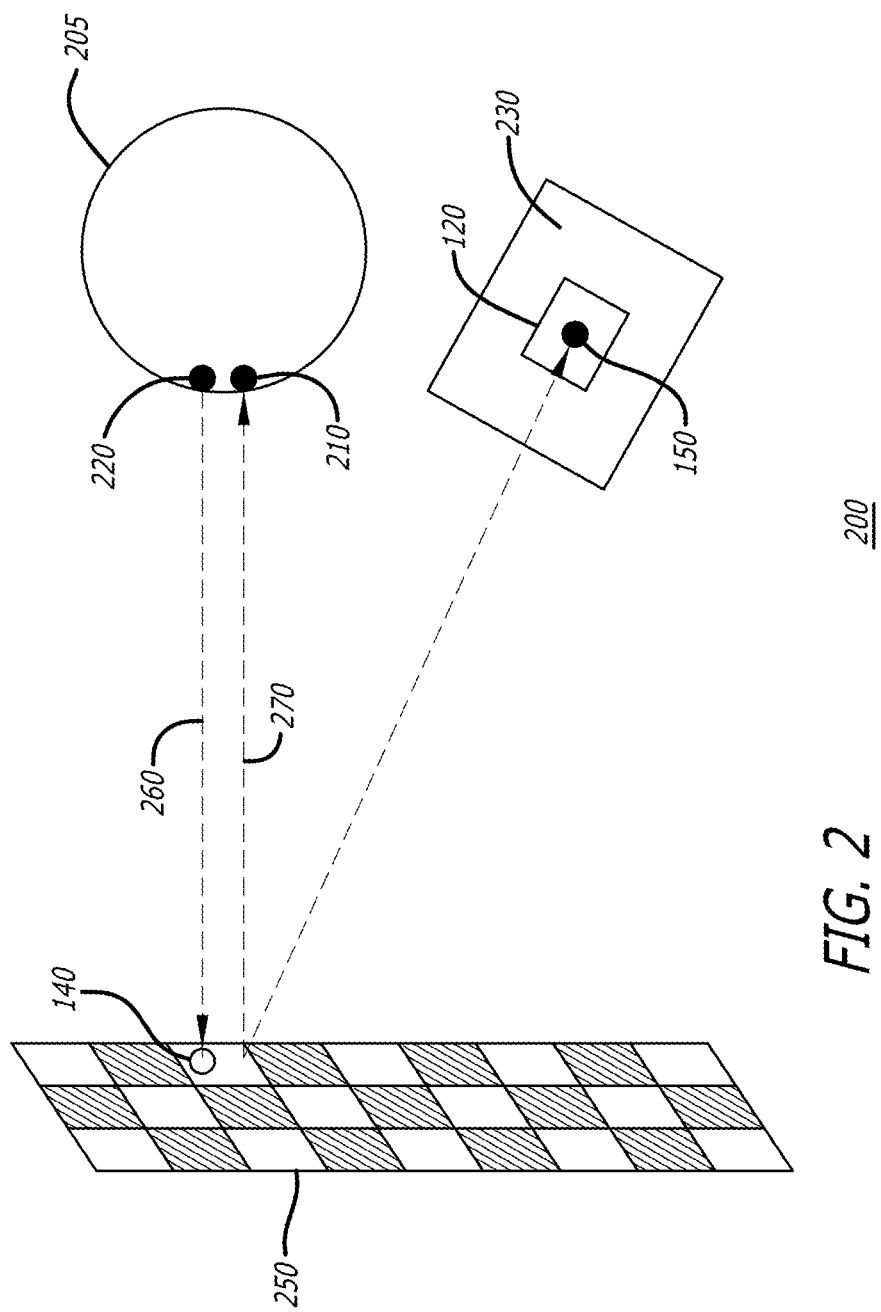
FIG. 2 is a diagram showing the disclosed system for calibration between a lidar sensor and a camera, in accordance with at least one embodiment of the present disclosure.

FIG. 2 is a diagram showing the disclosed system 200 for calibration between a lidar sensor 205 and a camera 230, in accordance with at least one embodiment of the present disclosure. The lidar sensor 205 comprises an emitter 220 and a receiver 210. During operation of the disclosed system, the emitter 220 of the lidar sensor 205 transmits at least one transmit signal(s) 260 to a target 250 (e.g., a target artifact, such as a chessboard), while the target is located in a particular location. In one or more embodiments, the transmit signal(s) 260 is an optical signal(s) or an infrared signal(s).

The transmit signal(s) 260 reflects off of the target 250 to generate at least one reflection signal(s) 270. The receiver 210 of the lidar sensor 205 receives the reflection signal(s) 270. At least one processor (e.g., refer to 607 of FIG. 6) generates a ranging measurement (i.e. a lidar measurement) 140 for the target 250 by using the transmit signal(s) 260 and the reflection signal(s) 270 (e.g., via calculating the time of arrival (TOA)). Simultaneously, as the transmit signal(s) 260 reflects off of the target 250, the camera 230 images the target 250 to obtain an imaging measurement (e.g., image) 150, which corresponds to the ranging measurement 140, on the image plane 120 of the camera 230.

It should be noted that the target 150 may be moved to different locations that are further or closer in distance to the lidar sensor 205 and/or camera 230. In addition, it should be noted that the processor(s) 607 may be located within the lidar sensor 205, within the camera 230, or remote from the lidar sensor 205 and the camera 230. In addition, there may be multiple processors 607 that may be located in different locations from each other. In at least one embodiment, the lidar sensor 205 and the camera 230 are housed together and/or mounted together. In other embodiments, the lidar sensor 205 and the camera 230 are located at separate locations, as is shown in FIG. 2.

Figure 3:
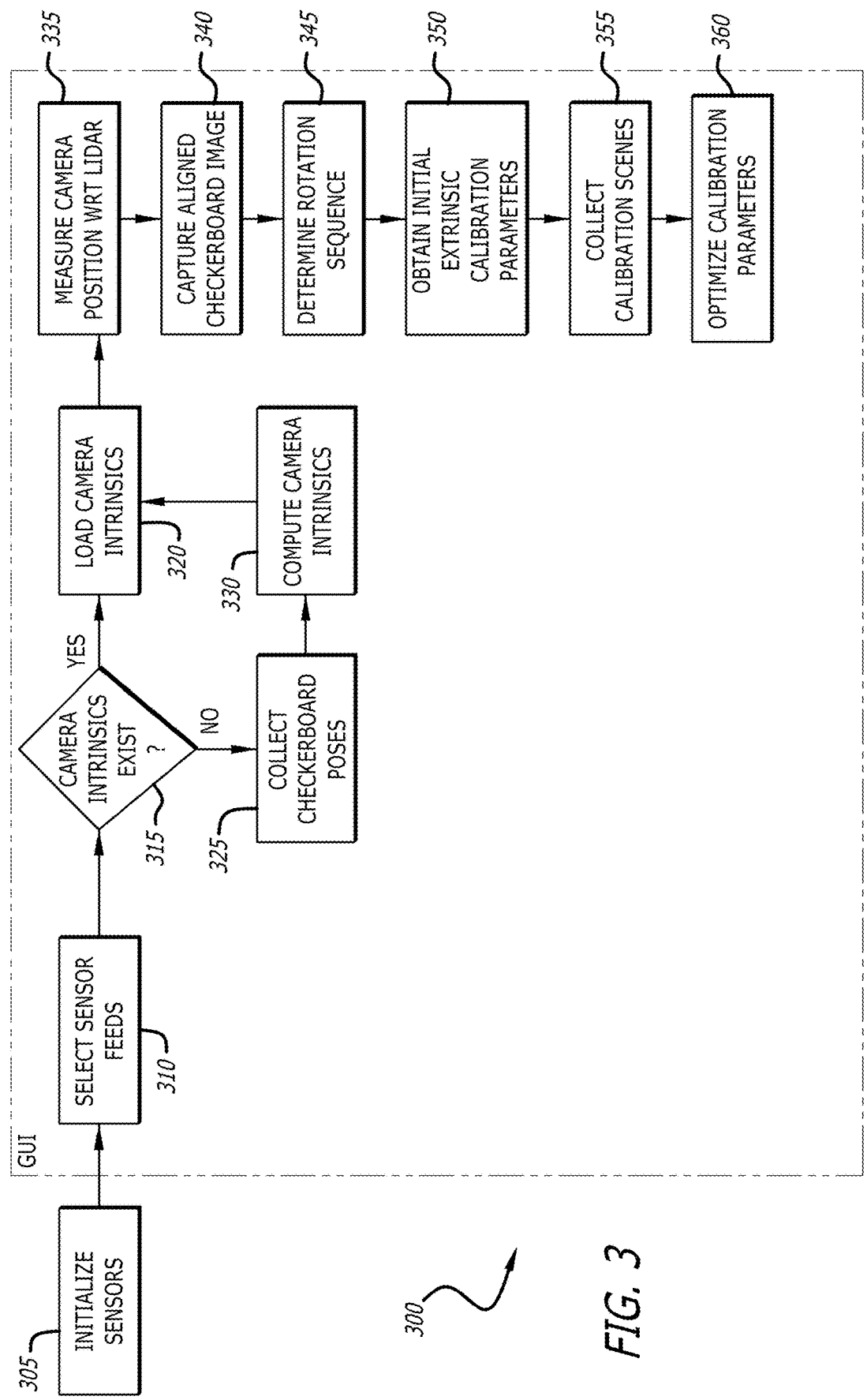
FIG. 3 is a block diagram showing the disclosed method for calibration between a lidar sensor and a camera, in accordance with at least one embodiment of the present disclosure.

FIG. 3 is a block diagram showing the disclosed method 300 for calibration between a lidar sensor and a camera, in accordance with at least one embodiment of the present disclosure. The entire process is executed through a calibration graphical user interface (GUI) (e.g., that may be displayed on a display 611 of a computer system 600 of FIG. 6), which ensures that all prerequisites are in place prior to executing the parameter optimization algorithm. The calibration GUI also provides visual feedback to the user regarding the components of each calibration scene and the performance of the optimization algorithm. Examples of the disclosed calibration GUI are shown in FIGS. 4A through 4H.

Figure 4A:
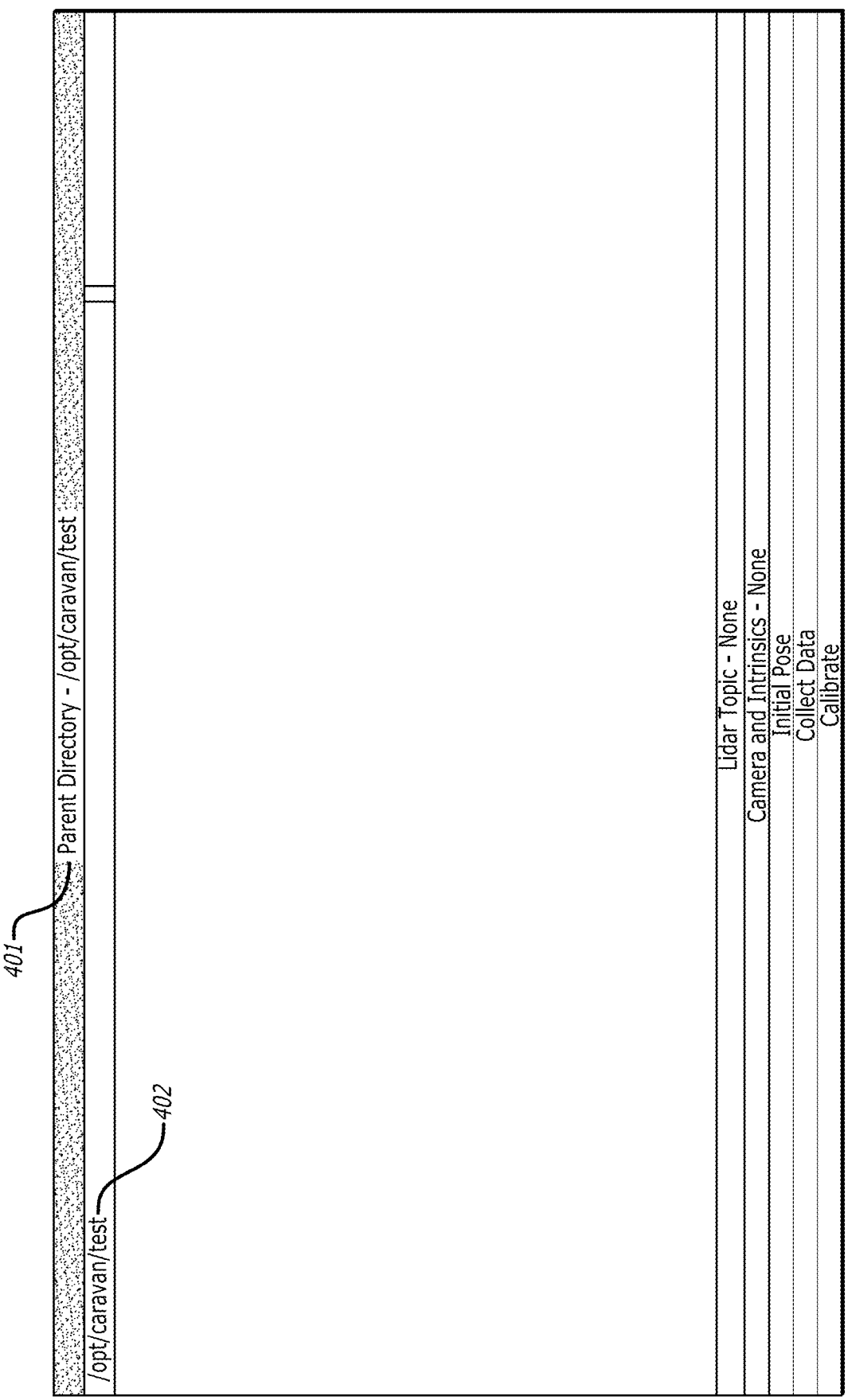
Figure 4C:
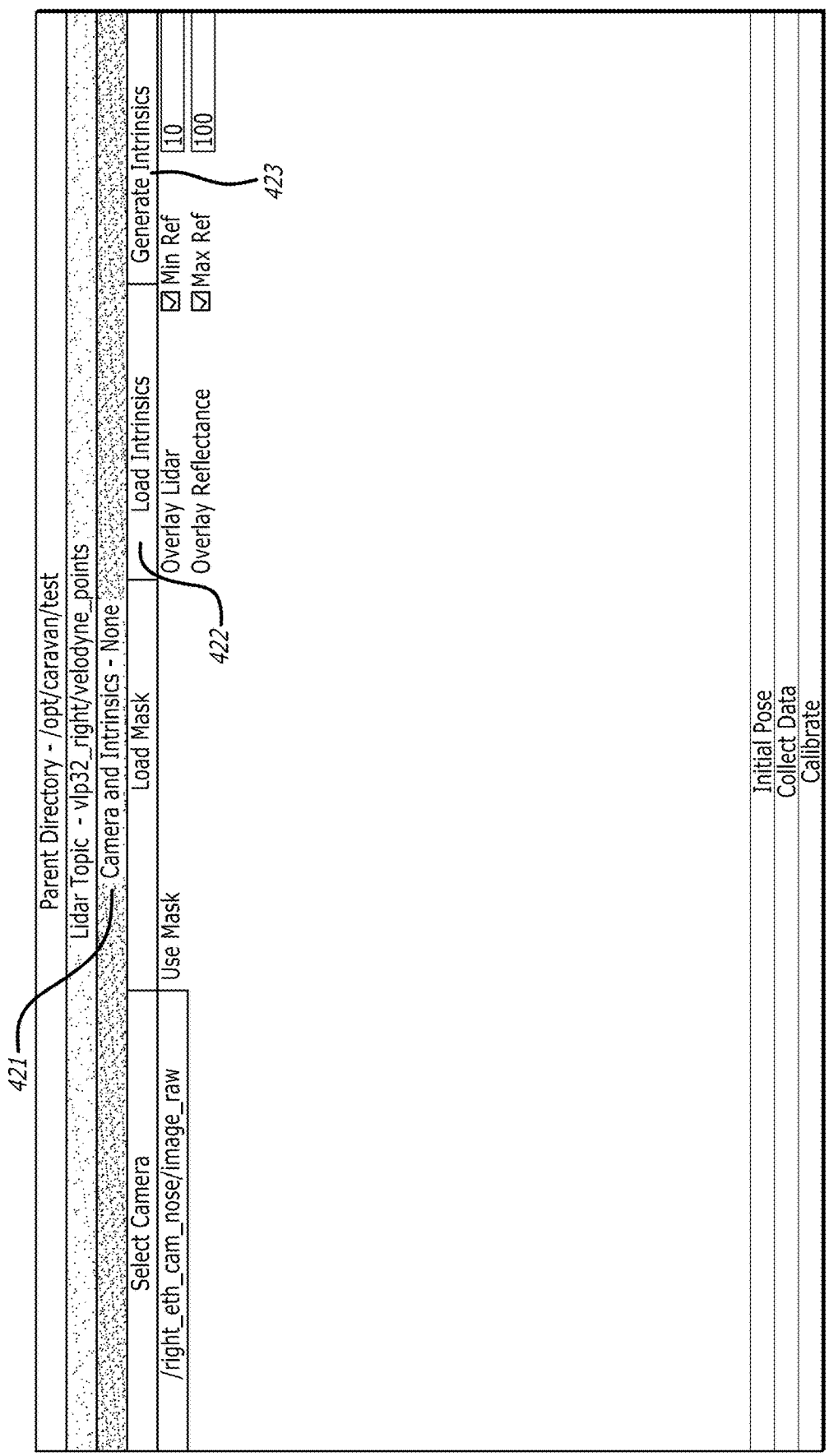
Figure 4D:
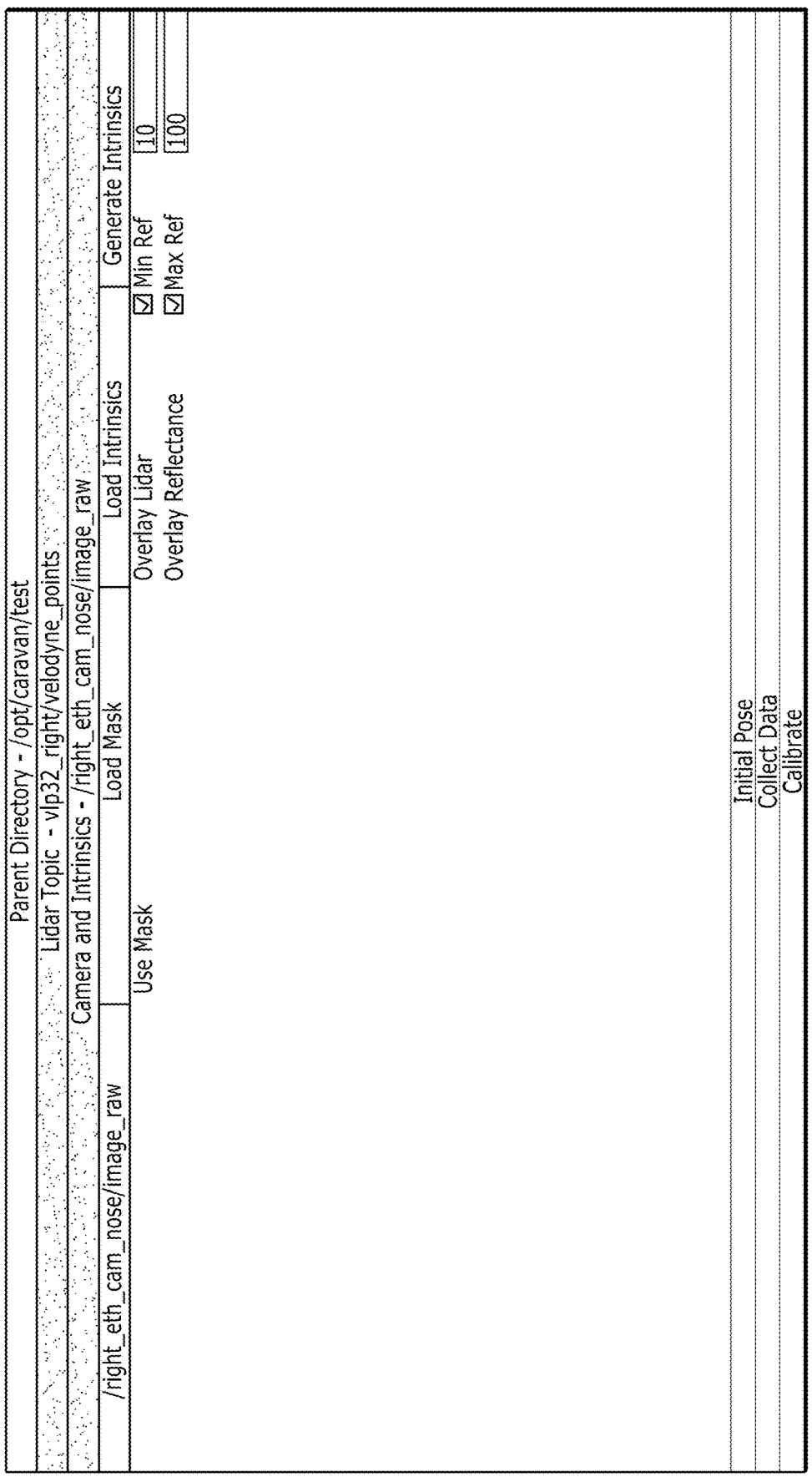

FIGS. 4A to 4H show various different exemplary graphical user interfaces (GUIs) 400, 410, 420, 430, 440, 450, 460, 470 that may be employed by the disclosed system for calibration between a lidar sensor and a camera, in accordance with at least one embodiment of the present disclosure. In particular, FIG. 4A shows a GUI 400 providing a selection 401 for selecting a parent directory (e.g., /opt/caravan/test) 402 for the data curation of the disclosed method. FIGS. 4B and 4C show GUIs 410, 420 providing a selection 411 for selecting the specific lidar sensor (e.g., /vlp32_right/velodyne_points) and a selection 421 for selecting the specific camera (e.g., /right_eth_cam_nose/image_raw), repectively, from specific directories. The GUI 420 of FIG. 4C also shows a selection 422 for loading camera intrinsic parameters, and a selection 423 for generating the camera intrinsic parameters, if the camera intrinsic parameters are not already known. FIG. 4D shows a GUI 430 showing the directory (e.g., /right_eth_cam_nose/image_raw) for specific camera sensor that has been selected.

Figure 4E:
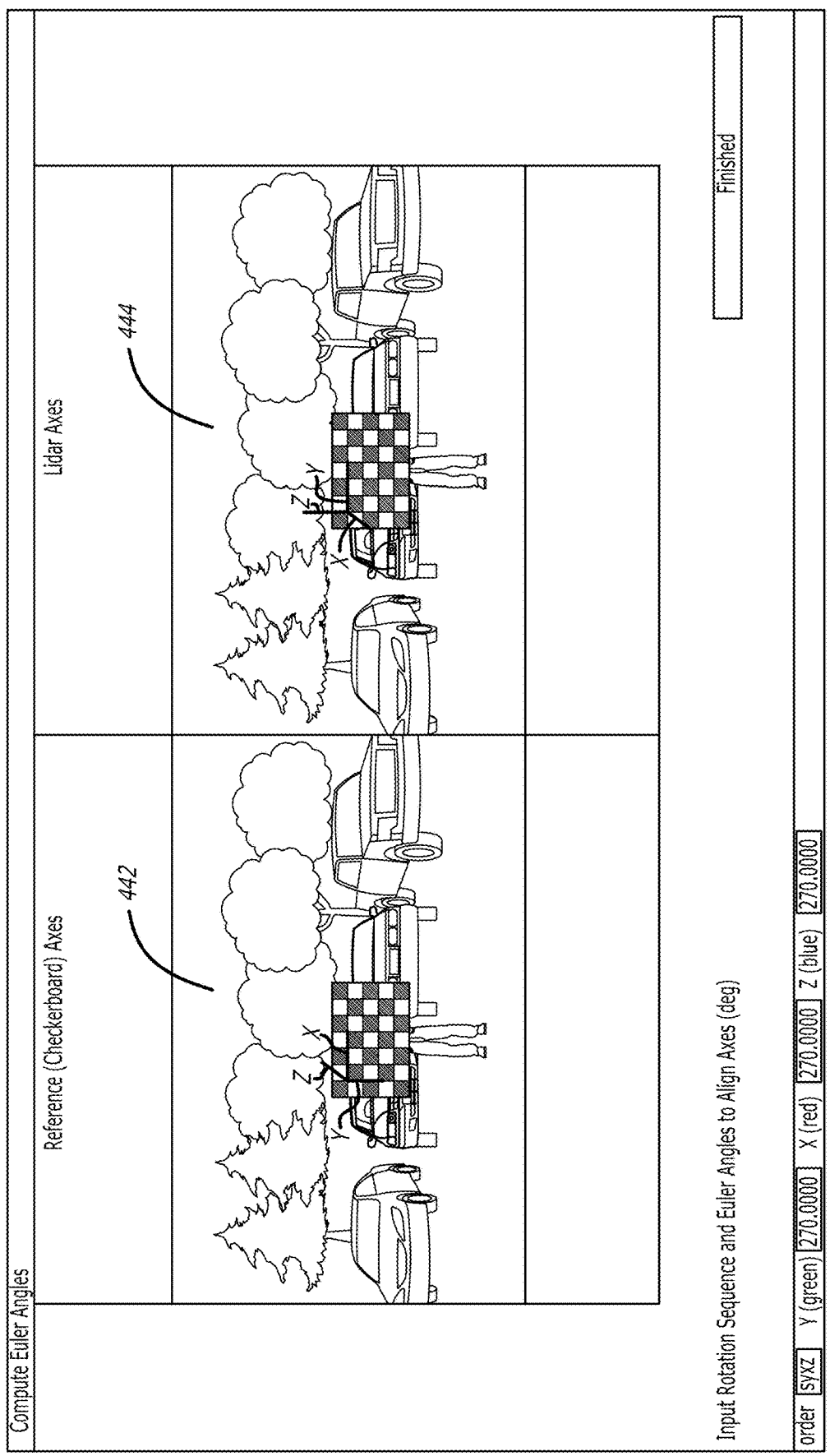
Figure 4F:
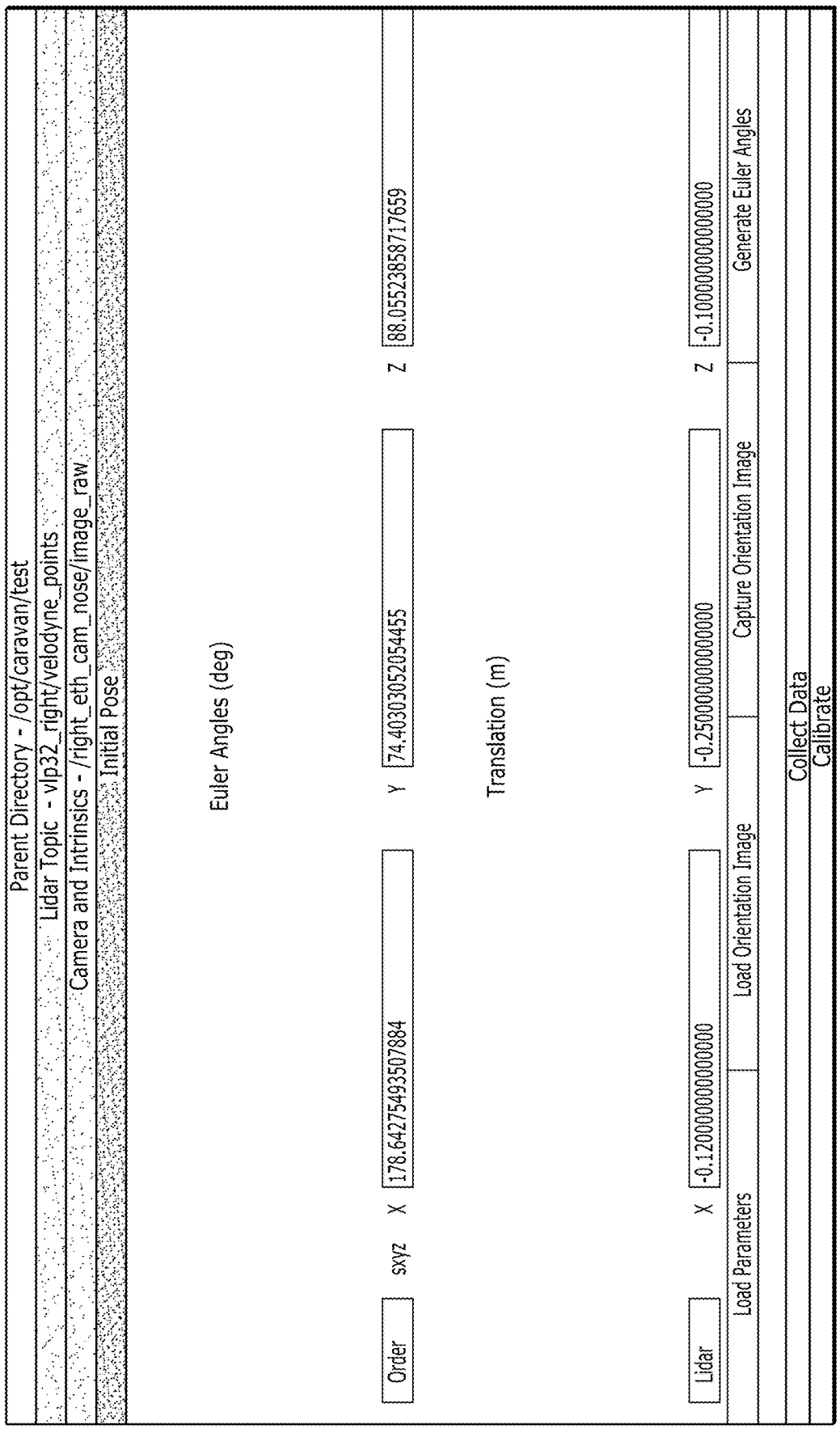
Figure 4H:
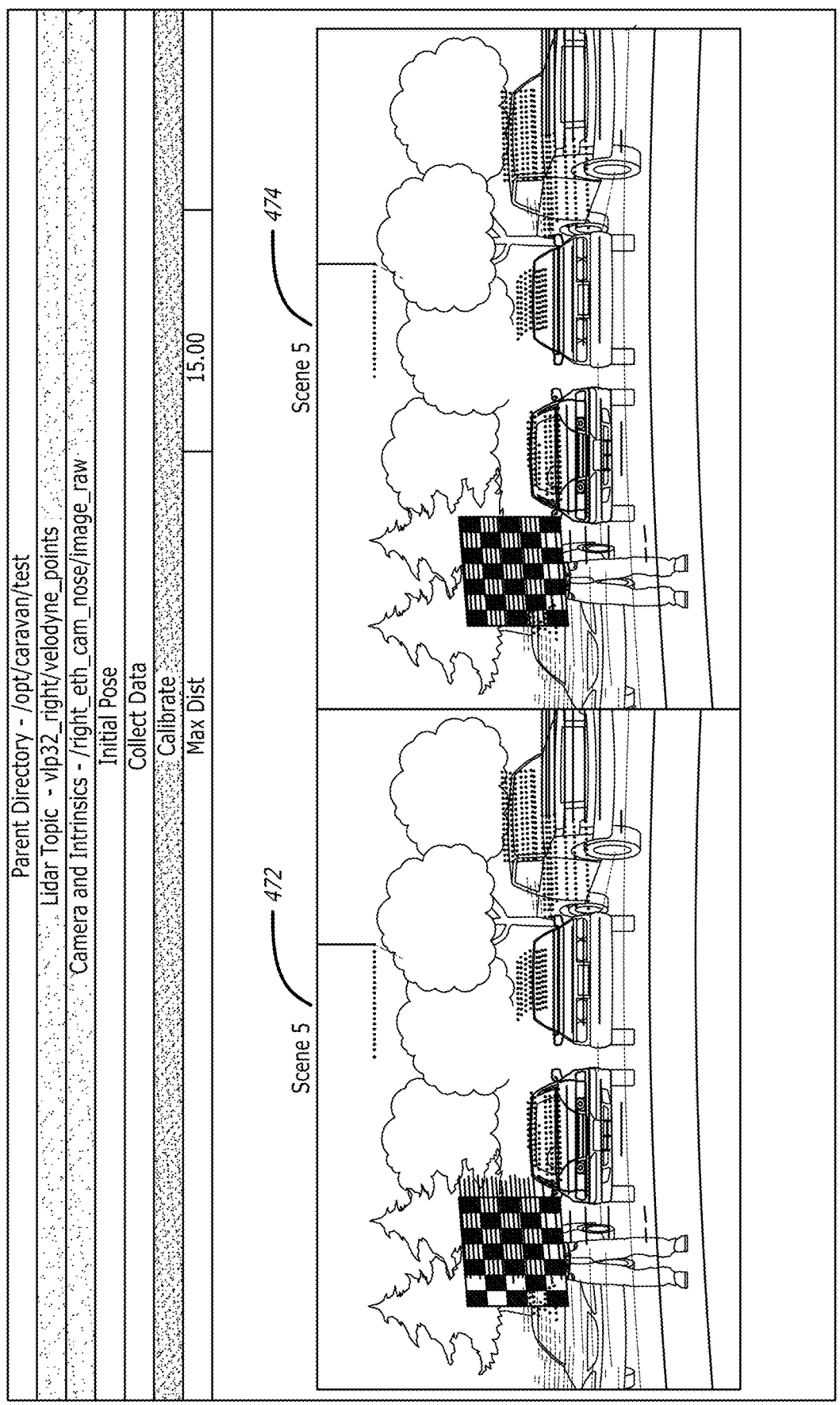

FIG. 4E shows a GUI 440 displaying images (e.g., scenes, such as initial images) 442, 444 having selections that allow for the inputting of a rotation sequence and initial Euler Angles in degrees (deg) to align the reference (chessboard) axes (shown on the left screen) to the lidar axes (shown on the right screen). FIG. 4F shows a GUI 450 showing the Euler Angle results for the alignment of the axes. FIG. 4G shows a GUI 460 for setting up the collection of data, where the "scene setup" selection indicates the amount of time in seconds (s) between shots (e.g., each shot is a single recording of the scene), the "record for" selection indicates the amount of time per shot, the "number of scenes" selection is the number of shots to be recorded, the "display scene" selection indicates which shot (e.g., single recording of the scene) to be displayed, the "record now" button, when depressed, causes the beginning of the recording of the shots, and the "stop button", when depressed, causes the stopping of the recording of the shots. FIG. 4H shows a GUI 470 showing scenes (e.g., calibration scenes) 472, 474 that exhibit the difference between the projection of lidar points pre-calibration versus post-calibration, where the left scene 472 shows the projection of the lidar points pre-calibration and the right scene 474 shows the projection of the lidar points post-calibration. The post-calibration scene 474 shows that the lidar points are more aligned with the chessboard than in the pre-calibration scene 472.

Referring back to FIG. 3, during operation of the disclosed method 300, once the sensors (e.g., the lidar sensor 205 and camera 230 of FIG. 2) have been powered on and connected to a message passing service (e.g., robot operating system (ROS)), the calibration GUI (e.g., refer to FIGS. 4A though 4H) is initialized (e.g., by processor 607 of FIG. 6) (Step 305). A parent directory is selected by a user for data curation (e.g., refer to the GUI 400 in FIG. 4A), and the appropriate sensor feeds (i.e. lidar sensor and camera) are chosen by the user (e.g., refer to the GUI 410, 420 in FIGS. 4B and 4C) (Step 310).

Then, it is determined if calibration intrinsic parameters (e.g., the distortion of the camera lens, etc.) for the chosen camera exist (Step 315). If the intrinsic calibration parameters have already been computed for the selected camera body and lens to pair with the selected lidar sensor, then those intrinsic parameters are loaded (e.g., refer to GUI 430 FIG. 4D, which shows a "load intrinsics" selection for the camera that may be selected by the user) (Step 320). If the intrinsic parameters must be computed (e.g., refer to GUI 430 FIG. 4D, which shows a "generate intrinsics" selection for the camera that may be selected by the user), this can easily be accomplished using a calibration tool such as the one contained in the ROS (e.g., by running ROS on processor 607 of FIG. 6). The procedure consists of physically moving (e.g., by a user or by a robotic vehicle) a planar chessboard calibration artifact across the camera field of view at different depths (Step 325) until the tool (e.g., ROS) reports sufficient poses have been collected to compute the intrinsic parameters (Step 330). After the intrinsic parameters have been computed (e.g., by running ROS), the intrinsic parameters are loaded into the system (Step 320).

Once the sensor pair for calibration has been selected (Step 310) and the camera intrinsics have been loaded (Step 320), an initial guess must be made of the extrinsic calibration parameters (e.g., initial extrinsic calibration parameters) (which comprise three translation parameters ($t_x$, $t_y$, $t_z$), and three Euler angles ($\psi$, $\theta$, $\phi$) (Step 350) for seeding the optimization algorithm. The initial guess of the translation parameters is accomplished by physically measuring (e.g., by a user or a robotic tool) the location of the camera with respect to the $X_L$, $Y_L$, $Z_L$ axes of the lidar sensor (Step 335). Establishing an initial guess for the three Euler angles which govern the rotational differences between the camera coordinate system $(X, Y, Z)_C$ and the lidar coordinate system $(X, Y, Z)_L$ is significantly more challenging. A planar chessboard calibration artifact is physically oriented (e.g., by the user or a robotic tool) so that it lies approximately coincident (e.g., aligned with) with the $Y_L$ and $Z_L$ axes of the lidar, and an image (e.g., an initial image) is captured by the camera (e.g., refer to the GUI 440 of FIG. 4E) (Step 340). A Levenberg-Marquardt optimization (e.g., run by processor 607 of FIG. 6) applied to the image (i.e. an initial image) determines the best fit transformation between the camera coordinate system and the planar chessboard (reference) coordinate system (refer to the GUI 440 in FIG. 4E). The intentional alignment of the chessboard with two of the lidar axes then allows the user to manually enter a rotation sequence (e.g., via GUI 440 in FIG. 4E) which will point the camera-to-chessboard axes in the same direction as the lidar axes. This allows for the chessboard to be oriented with any two of the lidar axes, and the rotation matrix ($R_{CL}$) can still be determined. Once this is accomplished, an estimate of the camera-to-chessboard-to-lidar rotation matrix ($R_{CL}$) can be computed (e.g., by processor 607 of FIG. 6) (refer to FIGS. 5A to 5C) (Step 345), and the estimates of the three prerequisite Euler angles ($\psi$, $\theta$, $\phi$) can be extracted from the rotation matrix ($R_{CL}$) (e.g., by processor 607 of FIG. 6) (Step 350) (e.g., refer to the GUI 450 of FIG. 4F) to obtain initial extrinsic calibration parameters ($t_x$, $t_y$, $t_z$, $\psi$, $\theta$, $\Phi$). A live feed of the camera is then generated with overlaid lidar points (e.g., and displayed on display 611 of FIG. 6), providing real-time feedback to the user on the quality of the initial parameters.

Figure 5A:
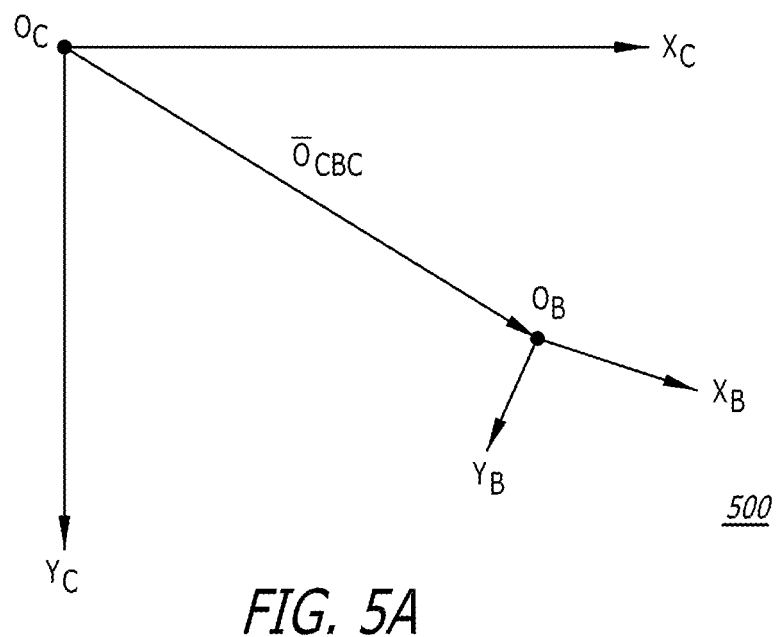
FIGS. 5A to 5C show graphs that illustrate the transformation from the camera coordinate system to the chessboard coordinate system to the lidar coordinate system, in accordance with at least one embodiment of the present disclosure.
Figure 5B:
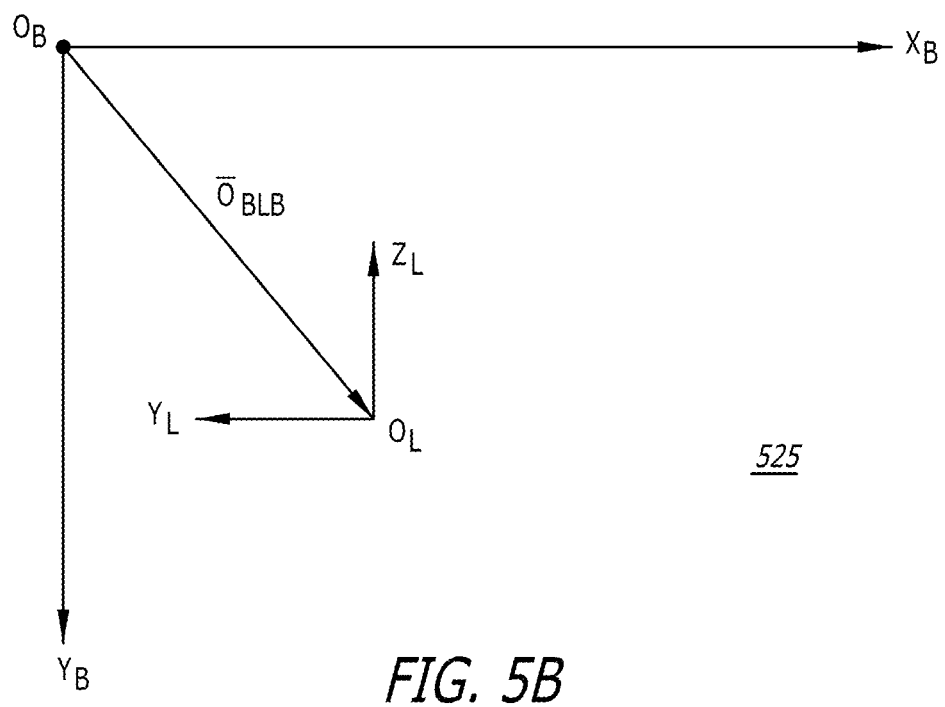
Figure 5C:
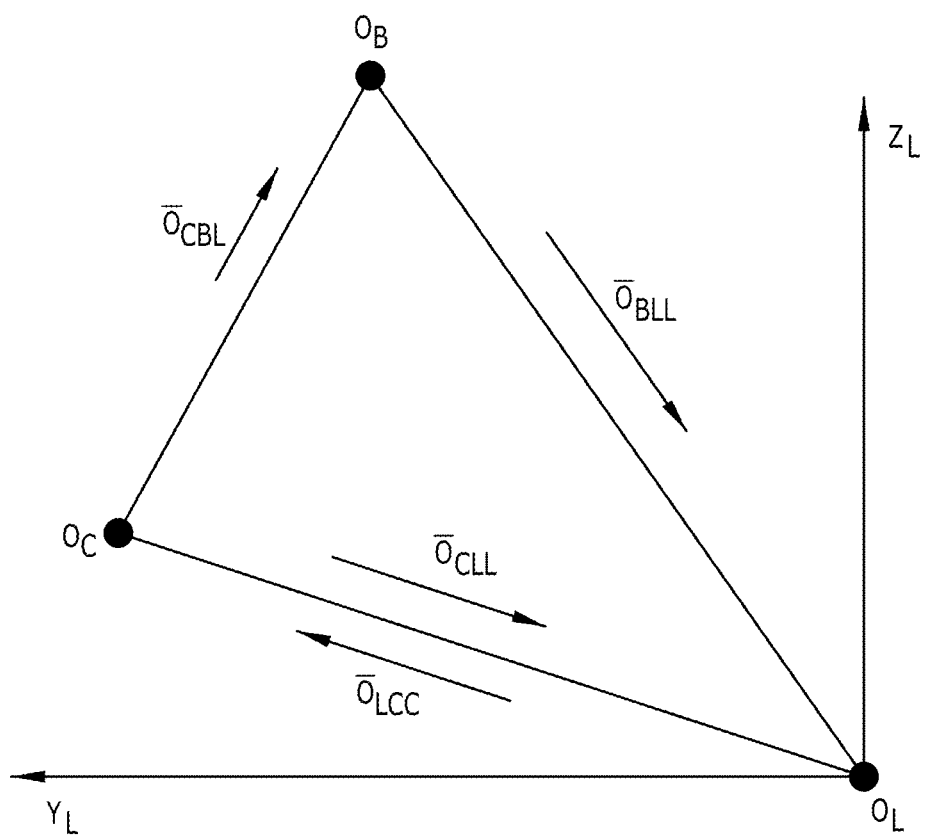

FIGS. 5A to 5C show graphs 500, 525, 550 that illustrate the transformation from the camera coordinate system (camera frame) to the chessboard coordinate system (chessboard frame) to the lidar coordinate system (lidar frame), in accordance with at least one embodiment of the present disclosure. In particular, FIG. 5A shows a graph 500 showing the transformation from the camera coordinate system to the chessboard coordinate system. The camera coordinate system to the chessboard coordinate system transformation is given by:

$$\begin{bmatrix} x_B \\ y_B \\ z_B \end{bmatrix} = R_{CB}\left(\begin{bmatrix} x_C \\ y_C \\ z_C \end{bmatrix} - \overline{O}_{CBC}\right)$$

Both $R_{CB}$ and $\overline{O}_{CBC}$ are found by applying Levenberg-Marquardt optimization to the image captured, and using the camera model (built from the camera intrinsics) and the known dimensions of the chessboard squares (e.g., ds in height by ds in width).

FIG. 5B shows a graph 525 showing the transformation from the chessboard coordinate system to the lidar coordinate system. Similarly, the chessboard coordinate system to the lidar coordinate system transformation is given by:

$$\begin{bmatrix} x_L \\ y_L \\ z_L \end{bmatrix} = R_{BL}\left(\begin{bmatrix} x_B \\ y_B \\ z_B \end{bmatrix} - \overline{O}_{BLB}\right)$$

Here, $R_{BL}$ is known because the chessboard is positioned such that:

$\hat{Z}_L \| \hat{Y}_B$ and $\hat{Y}_L \| \hat{X}_B$ $\overline{O}_{BLB}$ is an unknown. FIG. 5C shows a graph 550 showing the transformation from the camera coordinate system to the chessboard coordinate system to the lidar coordinate system. Therefore, to transform from the camera coordinate system to the lidar coordinate system:

$$\begin{bmatrix} x_L \\ y_L \\ z_L \end{bmatrix} = R_{BL}\left(\begin{bmatrix} x_B \\ y_B \\ z_B \end{bmatrix} - \overline{O}_{BLB}\right) = R_{BL}\left(R_{CB}\left(\begin{bmatrix} x_C \\ y_C \\ z_C \end{bmatrix} - \overline{O}_{CBC}\right) - \overline{O}_{BLB}\right)$$

$$R_{BL}\left(R_{CB}\left(\begin{bmatrix} x_C \\ y_C \\ z_C \end{bmatrix} - \overline{O}_{CBC}\right) - \overline{O}_{BLB}\right) =$$

-continued $$R_{BL}R_{CB}\begin{bmatrix} x_C \\ y_C \\ z_C \end{bmatrix} - (R_{BL}R_{CB}\overline{O}_{CBC} + R_{BL}\overline{O}_{BLB})$$

Let:

$R_{CL} = R_{BL}R_{CB} \Rightarrow R_{BL}R_{CB}\overline{O}_{CBC} + R_{BL}\overline{O}_{BLB} = R_{CL}\overline{O}_{CBC} + \overline{O}_{BLB} = \overline{O}_{CBL} + \overline{O}_{BLB} = \overline{O}_{CLL} = -\overline{O}_{LCL}$ $\overline{O}_{LCL}$ is measured as part of the calibration process. Therefore, the best fit transformation is:

$$\begin{bmatrix} x_L \\ y_L \\ z_L \end{bmatrix} = R_{CL}\begin{bmatrix} x_C \\ y_C \\ z_C \end{bmatrix} - \overline{O}_{CLL} = R_{CL}\begin{bmatrix} x_C \\ y_C \\ z_C \end{bmatrix} + \overline{O}_{LCL}$$

where $R_{CL}$ is the rotation matrix. It should be noted that $R_{CL}$ is a three by three (3×3) matrix in 3D cartesian space.

The extraction of the Euler angles ($\psi$, $\theta$, $\phi$) from the rotation matrix ($R_{CL}$) is as follows:

$$R_z(\psi) = \begin{bmatrix} \cos(\psi) & \sin(\psi) & 0 \\ -\sin(\psi) & \cos(\psi) & 0 \\ 0 & 0 & 1 \end{bmatrix}$$

$$R_y(\theta) = \begin{bmatrix} \cos(\theta) & 0 & -\sin(\theta) \\ 0 & 1 & 0 \\ \sin(\theta) & 0 & \cos(\theta) \end{bmatrix}$$

$$R_x(\phi) = \begin{bmatrix} 1 & 0 & 0 \\ 0 & \cos(\phi) & \sin(\phi) \\ 0 & -\sin(\phi) & \cos(\phi) \end{bmatrix}$$

$$R_z R_y R_x = \begin{bmatrix} R_{00} & R_{01} & R_{02} \\ R_{10} & R_{11} & R_{12} \\ R_{20} & R_{21} & R_{22} \end{bmatrix} ==$$

$$\begin{bmatrix} \cos(\psi)\cos(\theta) & \cos(\psi)\sin(\theta)\sin(\phi) + \sin(\psi)\cos(\phi) & -\cos(\psi)\sin(\theta)\cos(\phi) + \sin(\psi)\sin(\phi) \\ -\sin(\psi)\cos(\theta) & -\sin(\psi)\sin(\theta)\sin(\phi) + \cos(\psi)\cos(\phi) & \sin(\psi)\sin(\theta)\cos(\phi) + \cos(\psi)\sin(\phi) \\ \sin(\theta) & -\cos(\theta)\sin(\phi) & \cos(\theta)\cos(\phi) \end{bmatrix}$$

$\sin(\theta) = R_{20} \Rightarrow \theta = \sin^{-1}(R_{20})$ $-\cos(\theta)\sin(\phi) = R_{21} \Rightarrow \phi = \sin^{-1}\left(-\dfrac{R_{21}}{\cos(\sin^{-1}(R_{20}))}\right)$ $-\sin(\psi)\cos(\theta) = R_{10} \Rightarrow \psi = \sin^{-1}\left(-\dfrac{R_{10}}{\cos(\sin^{-1}(R_{20}))}\right)$ Referring back to FIG. 3, once an initial guess for the extrinsic calibration parameters has been determined (Step 350), the calibration scenes (e.g., calibration dataset) are collected (refer to the GUI 460 of FIG. 4G) (Step 355). The procedure for this is to capture time-synchronized returns from the lidar and the camera (scan/image pairs) (e.g., a single lidar scan and a corresponding single camera image) across the entire field of view of the camera (e.g., by physically moving the target across the field of view of the camera) at multiple depths (e.g., by moving the target to multiple different depths (i.e. distances) away from the camera). In practice, it has been discovered that at certain observation angles, the reflectivity delta between the black and white chessboard squares goes to zero. This necessitates observation of the live overlay feed to ensure that the chessboard remains oriented in such a way that the black and white squares return distinctive reflectivity values from the lidar. A rule of thumb for collecting data at varying ranges is that three different ranges are sufficient. In one or more embodiments, the furthest range may be at twelve (12) meters. The closest range is dependent upon the choice of camera focal length and the size of the chessboard. In one or more embodiments, the closest range should be chosen so that the chessboard takes up no more than one-fourth (¼) of the camera field-of-view. In one or more embodiments, the third range may be selected to lie mid-way between the first two ranges. It should be noted that, in other embodiments, data may be collected at more or less than three different ranges.

Once sufficient calibration scenes have been collected (Step 355), the extrinsic calibration parameters are optimized (Step 360). This is accomplished by the repeated execution of a differential evolution optimization scheme (e.g., run by processor 607 of FIG. 6) which is detailed below. The results of the optimization are then displayed (e.g., on display 611 of FIG. 6) to the user for evaluation (e.g., refer to the GUI 470 of FIG. 4H).

FIG. 6 illustrates a block diagram of an illustrative computing system 600 suitable for implementing an embodiment of the present disclosure, in accordance with at least one embodiment of the present disclosure. For example, at least one processor (e.g., which may be located within the camera 230 and/or the lidar sensor 205) of the disclosed system may include and/or employ at least a portion of the disclosed computer system 600. Computing system 600 includes a bus 606 or other communication mechanism for communicating information, which interconnects subsystems and devices, such as processor 607, system memory 608 (e.g., main memory such as a random-access memory (RAM)), static storage device 609 (e.g., read-only memory (ROM)), storage device 610 such as a disk drive (e.g., magnetic or optical), communication interface 614 (e.g., modem or Ethernet card), display 611 (e.g., cathode-ray tube (CRT) or liquid-crystal display (LCD)), input device 612 (e.g., keyboard), and cursor control (not shown).

According to one embodiment of the present disclosure, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor 607 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 608.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the present disclosure, execution of the sequences of instructions to practice the present disclosure is performed by a single computer system 600. According to other embodiments of the present disclosure, two or more computer systems 600 coupled by communication link 615 (e.g., local area network (LAN), public telephone switched network (PTSN), or wireless network) may perform the sequence of instructions required to practice the present disclosure in coordination with one another.

Computer system 600 may transmit and receive messages, data, and instructions, including program (e.g., application code), through communication link 615 and communication interface 614. Received program code may be executed by processor 607 as it is received, and/or stored in disk drive 610, or other non-volatile storage for later execution. Computer system 600 may also interact with a database 632 within a database system 631 via a data interface 633 where the computer system 600 may store and retrieve information or data of the electronic design into and from the database system 631.

III. Parameter Optimization

Figure 7:
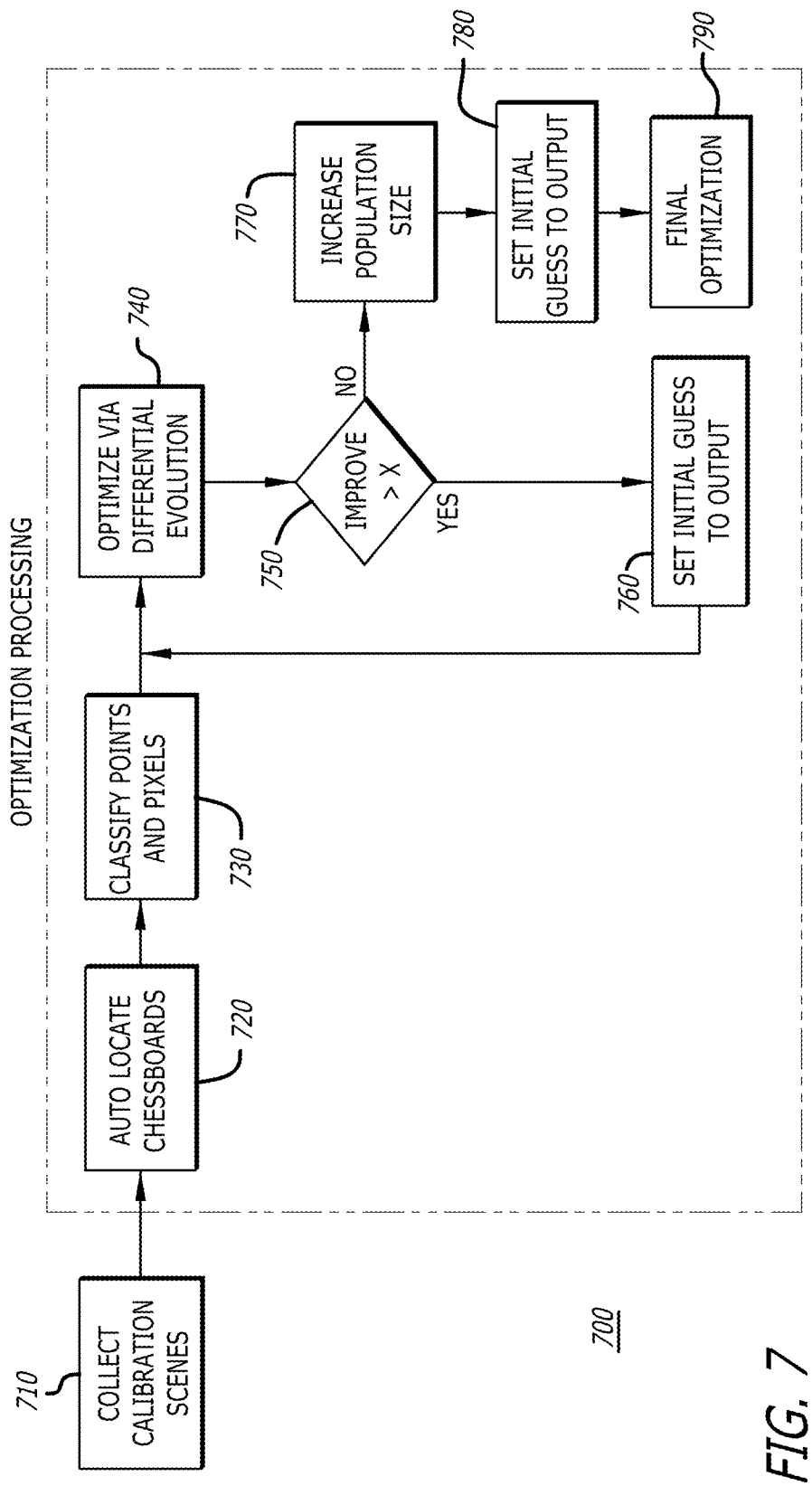
FIG. 7 is a block diagram showing the disclosed method for optimizing the extrinsic calibration parameters, in accordance with at least one embodiment of the present disclosure.

The optimization of the extrinsic calibration parameters (Step 360 of FIG. 3) is a multistep process which is summarized in FIG. 7. FIG. 7 is a block diagram showing the disclosed method 700 for optimizing the extrinsic calibration parameters, in accordance with at least one embodiment of the present disclosure. Once the time-synchronized scan/image pairs (e.g., calibration scenes) have all been collected (Step 710), they are each automatically processed (e.g., by processor 607 of FIG. 6) to extract the relevant portions (i.e. to auto locate the chessboard as observed in both the camera image and the lidar scan) (Step 720). The procedure for this is detailed in FIGS. 9 and 10, which are discussed in Section IV.

The processed scan/image pairs are then passed to an optimization routine (e.g., run by processor 607 of FIG. 6). Each of the points in the lidar scans is then classified as either black, white, or neither based upon the reflectivity value of the point (Step 730). And, similarly, each of the pixels in the camera images are classified as black, white, or neither based upon the grayscale value (Step 730). This process of classifying the points and pixels is captured in FIG. 8.

Figure 8:
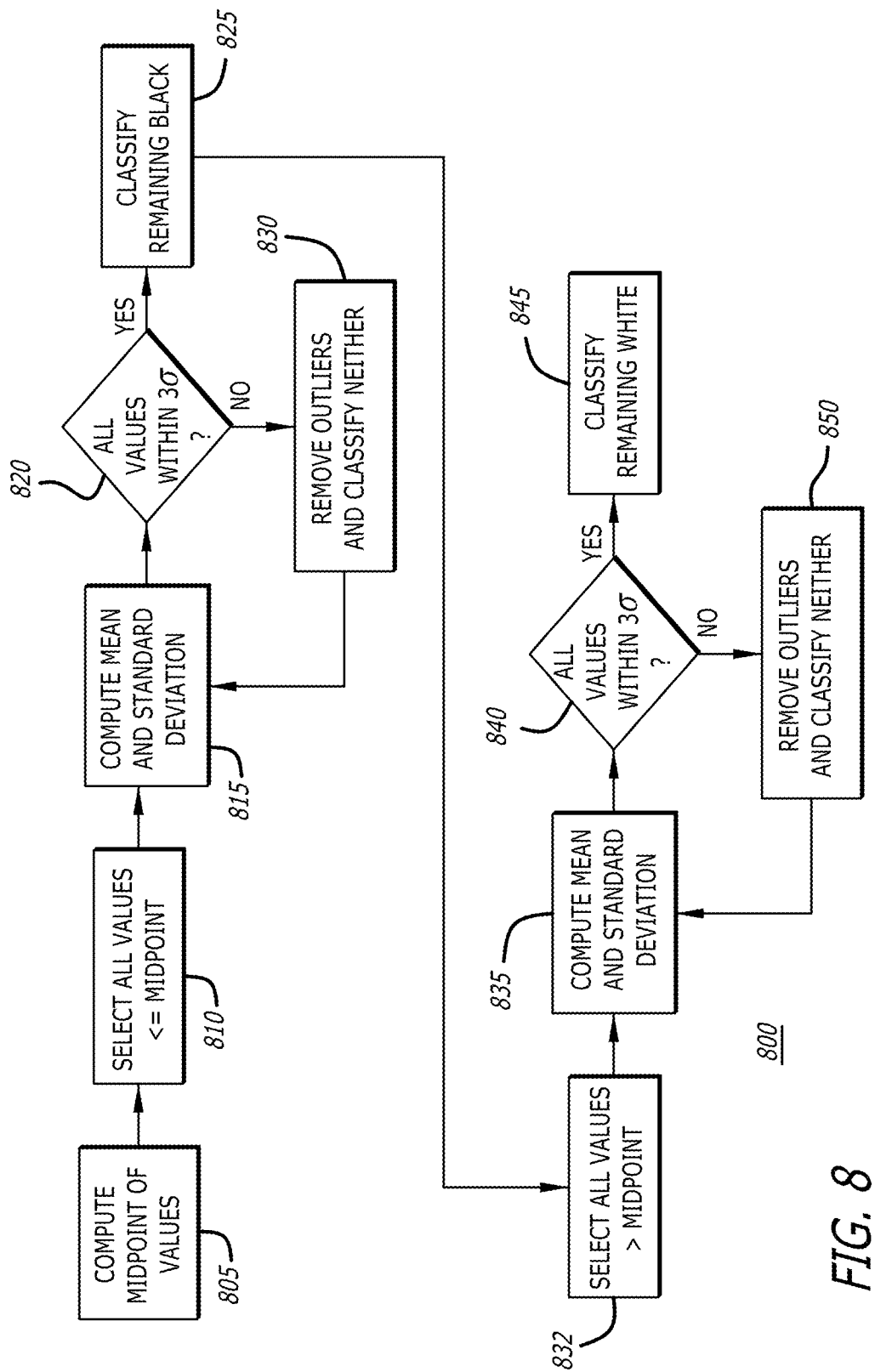
FIG. 8 is a block diagram showing the disclosed method for classifying lidar points and camera pixels as black or white, in accordance with at least one embodiment of the present disclosure.

FIG. 8 is a block diagram showing the disclosed method 800 for classifying lidar points and camera pixels as black or white, in accordance with at least one embodiment of the present disclosure. The method 800 of FIG. 8 is performed once for classifying the lidar points as either black, white, or neither. Then, the method 800 of FIG. 8 is performed again for classifying the camera pixels as either black, white, or neither.

For the classifying of the lidar points, at the start of the method 800, a midpoint value of the range of the point values are computed (e.g., by processor 607 of FIG. 6) (e.g., pure black points each have a point value equal to zero (0) and pure white points each have a point value equal to one (1) and, thus, the midpoint value between these two extreme point values will be set equal to 0.5) (Step 805). Then, all point values that are less than or equal to the midpoint value (e.g., 0.5) are selected (e.g., the points (e.g., black and dark grey points), which are less than or equal to the midpoint value of 0.5, are selected) (Step 810). Then, the mean and standard deviation ($\sigma$) of the selected points is computed (e.g., by processor 607 of FIG. 6) (Step 815).

After the mean and standard deviation of the selected points has been computed (Step 815), it is determined (e.g., by processor 607 of FIG. 6) which of the selected points are within three sigma ($3\sigma$) of the mean (i.e. which of the selected points are within three standard deviations from the calculated mean) (Step 820). For the points that are determined to not be within three sigma of the mean, outliers from these particular points are removed (e.g., discarded) (e.g., by processor 607 of FIG. 6), and the remaining points are classified (e.g., by processor 607 of FIG. 6) as neither (Step 830). Then, the mean and standard deviation is computed (e.g., by processor 607 of FIG. 6) for the remaining points (Step 815), and it is determined (e.g., by processor 607 of FIG. 6) which of the remaining points are within three sigma of the mean (Step 820). This process (i.e. Steps 830, 815, 820) repeats until all of the remaining points lie with three sigma of the mean. Then, once all of the points lie within three sigma of the mean, the points are classified (e.g., by processor 607 of FIG. 6) as black points (Step 825).

After the points are classified as black points (Step 825), all point values of the classified black points that are greater than the midpoint value (e.g., 0.5) are selected (e.g., the points (e.g., white and off-white points), which are greater than the midpoint value of 0.5, are selected) (Step 832). Then, the mean and standard deviation ($\sigma$) of the selected points is computed (e.g., by processor 607 of FIG. 6) (Step 835).

After the mean and standard deviation of the selected points has been computed (Step 835), it is determined (e.g., by processor 607 of FIG. 6) which of the selected points are within three sigma ($3\sigma$) of the mean (i.e. which of the selected points are within three standard deviations from the calculated mean) (Step 840). For the points that are determined to not be within three sigma of the mean, outliers from these particular points are removed (e.g., discarded) (e.g., by processor 607 of FIG. 6), and the remaining points are classified (e.g., by processor 607 of FIG. 6) as neither (Step 850). Then, the mean and standard deviation is computed (e.g., by processor 607 of FIG. 6) for the remaining points (Step 835), and it is determined (e.g., by processor 607 of FIG. 6) which of the remaining points are within three sigma of the mean (Step 840). This process (i.e. Steps 850, 835, 840) repeats until all of the remaining points lie with three sigma of the mean. Then, once all of the points lie within three sigma of the mean, the points are classified (e.g., by processor 607 of FIG. 6) as white points (Step 845).

As noted above, after the method 800 of FIG. 8 is performed for classifying the lidar points as either black, white, or neither; the method 800 of FIG. 8 is performed again similarly for classifying the camera pixels as either black, white, or neither. Then, the classification of the lidar points and camera pixels is complete (Step 730 of FIG. 7).

Referring back to FIG. 7, the total number of lidar points, which are classified as black or white (Step 730), is computed as $C_{tot} = \Sigma_{i=0}^{N} C_{bi} + C_{wi}$, where N is the number of scan/image pairs in the calibration dataset, $C_{tot}$ is the total number of points that are classified as black or white, $C_{bi}$ is the number of black lidar points, and $C_{wi}$ is the number of white lidar points. We then project the lidar points onto the camera images for each scan/image pair using the current estimate of the extrinsic calibration parameters and count how many black lidar points project onto black camera pixels and white lidar points project onto white camera pixels, $$M_{tot} = \sum_{i=0}^{N} M_{bi} + M_{wi},$$

where N is the number of scan/image pairs in the calibration dataset, $M_{tot}$ is the number of matching projections (i.e. a matching lidar point with a camera pixel), where $M_{bi}$ is the number of matching projections of black lidar points, and $M_{wi}$ is the number of matching projections of white lidar points. From these black/white matching correspondences, we construct a loss function, $$L(t_x, t_y, t_z, \psi, \theta, \phi) = 1 - \frac{M_{tot}}{C_{tot}}.$$

This loss function is minimized by using the bounded, global optimization technique differential evolution (DE) (Step 740). In one or more embodiments, the initial population size is selected to be thirty (30). However, in other embodiments, the initial population size may be chosen to be greater than or less than 30, as is selected in this example. Once the DE algorithm converges to a solution, the final value of the cost function is compared to the previous best value to determine if the cost function has improved by X (Step 750). If the cost function has improved by more than X (e.g., ten (10) percent (%)), the initial guess of the extrinsic calibration parameters is set to be the estimate returned by the optimizer (Step 760), and the DE algorithm is run again (Step 740). However, if the cost function has not improved by more than X; the population size is increased (e.g., increased to 200) (Step 770), the initial guess of the extrinsic calibration parameters is set to be the estimate returned by the optimizer (Step 780), and the DE algorithm is run a final time (Step 790).

IV. Automatically Extracting the Chessboard from Calibration

It is possible to significantly reduce the optimization processing time by minimizing the number of lidar points, which must be projected onto the camera images each time the cost function is computed. Additionally, it is simpler to classify both points and pixels as either black or white when the majority of the points present belong to one or the other of these two classes (as opposed to the majority of the points belonging to the neither class). The amount of collected calibration data precludes any attempt to manually select such regions. Thus, a process is presented below for automatically detecting the chessboard in both the camera (refer to FIG. 9) and the lidar (refer to FIG. 10) datasets.

Figure 9:
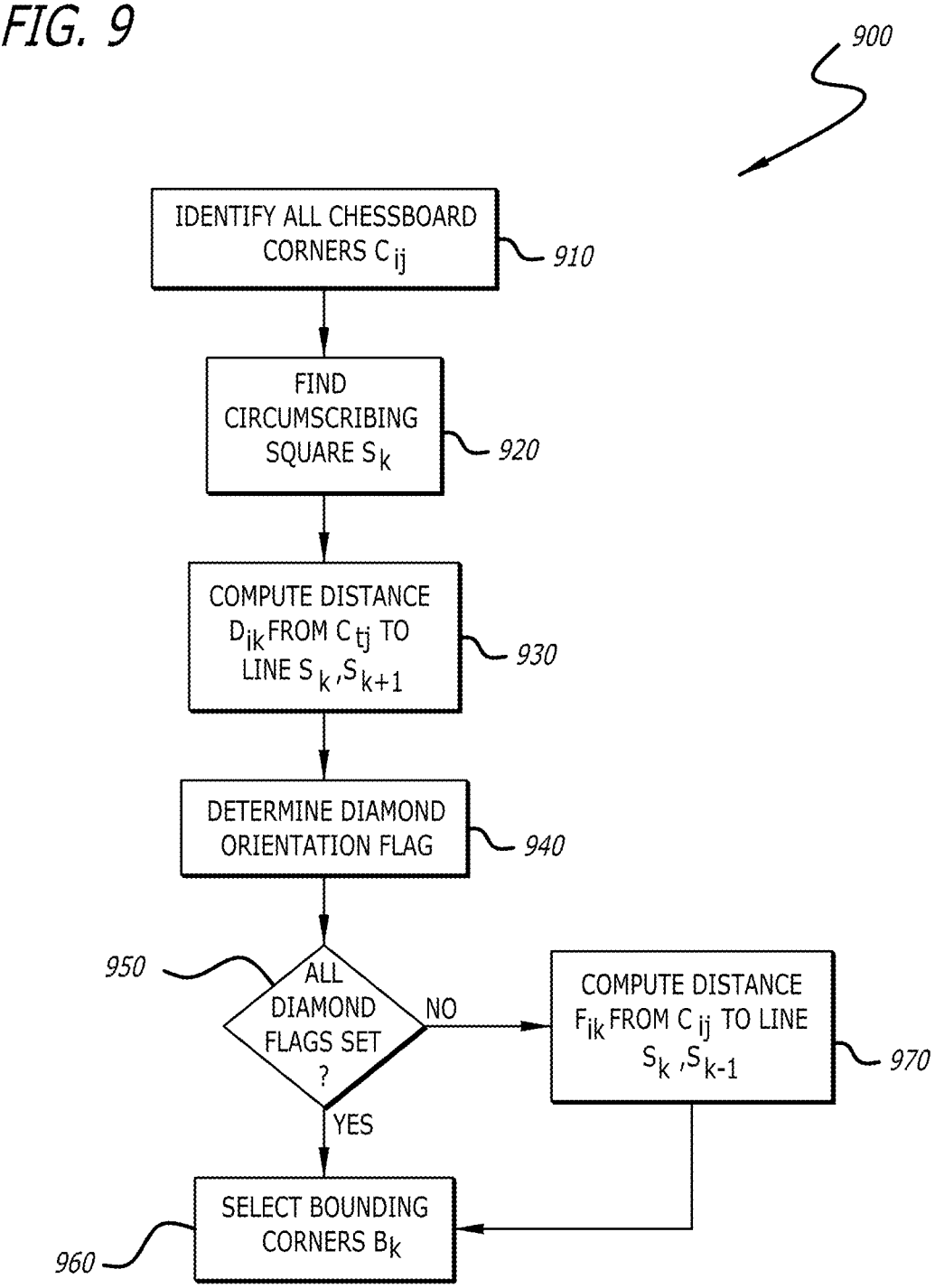
FIG. 9 is a block diagram showing the disclosed method for auto-locating the chessboard in a camera image, in accordance with at least one embodiment of the present disclosure.

Detecting the chessboard in the camera images is by far the easiest and most reliable part of this process. It is a well understood problem in computer vision, and there are existing packages (e.g., findChessboardCorners in OpenCV) for accomplishing this. FIG. 9 is a block diagram showing the disclosed method 900 for auto-locating the chessboard in a camera image, in accordance with at least one embodiment of the present disclosure. At the start of the method 900, pixel locations for all of the chessboard corners are computed ($C_{ij}$, i∈[0, M], j∈[0, N], where M is the number of rows on the chessboard and N is the number of columns) (e.g., by processor 607 of FIG. 6) (Step 910). Then, the four corners, which constitute the bounding corners of the entire chessboard calibration artifact, are determined (e.g., by processor 607 of FIG. 6). In order to make this determination, the square which circumscribes all of the located corner points is computed (e.g., by processor 607 of FIG. 6), and the pixel locations for the circumscribing corner points ($S_k$, k∈[0,3]) are established (e.g., by processor 607 of FIG. 6) (Step 920).

Then, it is determined (e.g., by processor 607 of FIG. 6) if the chessboard has a diamond orientation (as opposed to a rectangular orientation) in the image. This is achieved by computing (e.g., by processor 607 of FIG. 6) the distances ($D_{kl}$, k∈[0,3], l∈[0, (M+1)*(N+1)]) of all chessboard corners to the circumscribing square side defined by the $S_k$ and $S_{k+1}$ (Step 930). Then, the X=min(M,N) closest points to the square side are determined (e.g., by processor 607 of FIG. 6), and the standard deviation of the distance of these close points is compared (e.g., by processor 607 of FIG. 6) to the standard deviation of all the distances. If $\sigma_{close} > a\sigma_{all}$, a∈(0, 1), $S_k$ is flagged as being a potential diamond corner (Step 940) to determine a diamond orientation flag. This procedure is repeated for all the circumscribing square corners.

Then, it is determined (e.g., by processor 607 of FIG. 6) if all of the circumscribing square corners are flagged as diamond corners (Step 950). If it is determined that all of the circumscribing square corners are flagged as diamond corners, the bounding corners are set as $$\left(B_k = C_{ij}, [i, j] = \operatorname*{argmin}_l(D_{kl}), k \in [0, 3]\right)$$

(Step 960). However, if it is determined that all of the circumscribing square corners are not flagged as diamond corners, the above procedure is repeated using square sides $S_k$ and $S_{k-1}$, and calculating the corresponding distances, $F_{kl}$ (Step 970). Then, the bounding corners in this case are set as $$B_k = C_{ij}, [i, j] = \operatorname*{argmin}_l(D_{kl} + F_{kl}), k \in [0, 3]. \quad \text{(Step 960)}$$

Figure 11A:
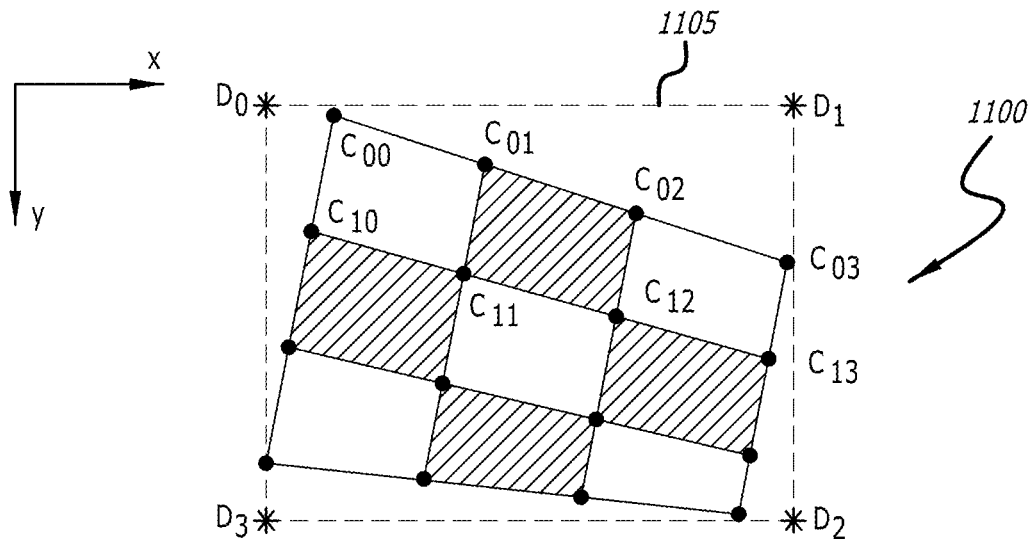
FIGS. 11A to 11E show graphs that illustrate how to determine whether the chessboard is in a diamond orientation or a rectangular orientation, in accordance with at least one embodiment of the present disclosure.

FIGS. 11A to 11E show graphs 1100, 1110, 1120, 1130, 1140 that illustrate how to determine whether the chessboard is in a diamond orientation or a rectangular orientation, in accordance with at least one embodiment of the present disclosure. In particular, graph 1100 of FIG. 11A shows the definition of the pixel coordinates. In FIG. 11A:

$C_{ij}$=(x,y) are pixel coordinates.
$D_0$=(min(x) {$C_{ij}$}, min(y) {$C_{ij}$}),
$D_1$=(min(x) {$C_{ij}$}, min(y) {$C_{ij}$}),
$D_2$=(min(x) {$C_{ij}$}, min(y) {$C_{ij}$}), and
$D_3$=(min(x) {$C_{ij}$}, min(y) {$C_{ij}$}) are the coordinates of the corners of the circumscribing square 1105, which surrounds the chessboard.

It should be noted that, in FIG. 11A, the chessboard is shown to not be a perfect rectangle. This is because, in reality, the chessboard will likely not be perfectly positioned to be perpendicular to the lens of the camera and, as such, the chessboard will appear to be skewed in the camera image, as is shown in FIG. 11A.

Figure 11B:
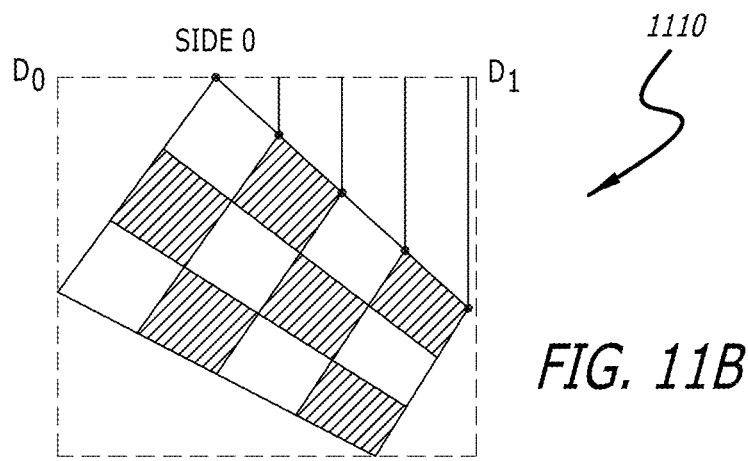
Figure 11C:
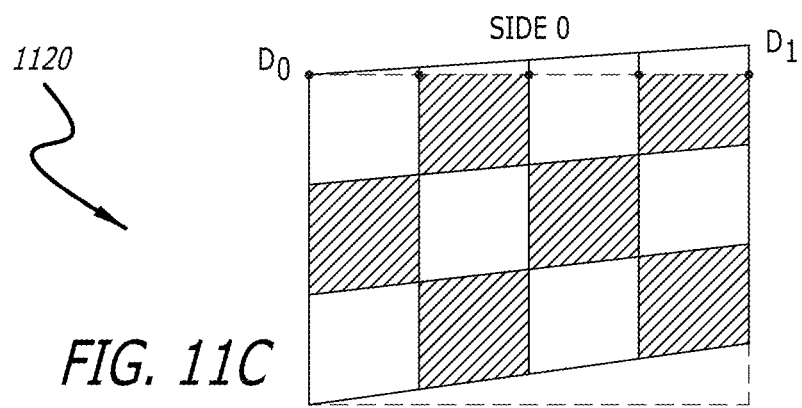

FIGS. 11B through 11E show how it is determined whether the chessboard is in a diamond orientation or in a rectangular orientation. In particular, graph 1110 of FIG. 11B shows an example of a chessboard in a diamond orientation, and graph 1120 of FIG. 11C shows an example of a chessboard in a rectangular orientation.

Figure 11D:
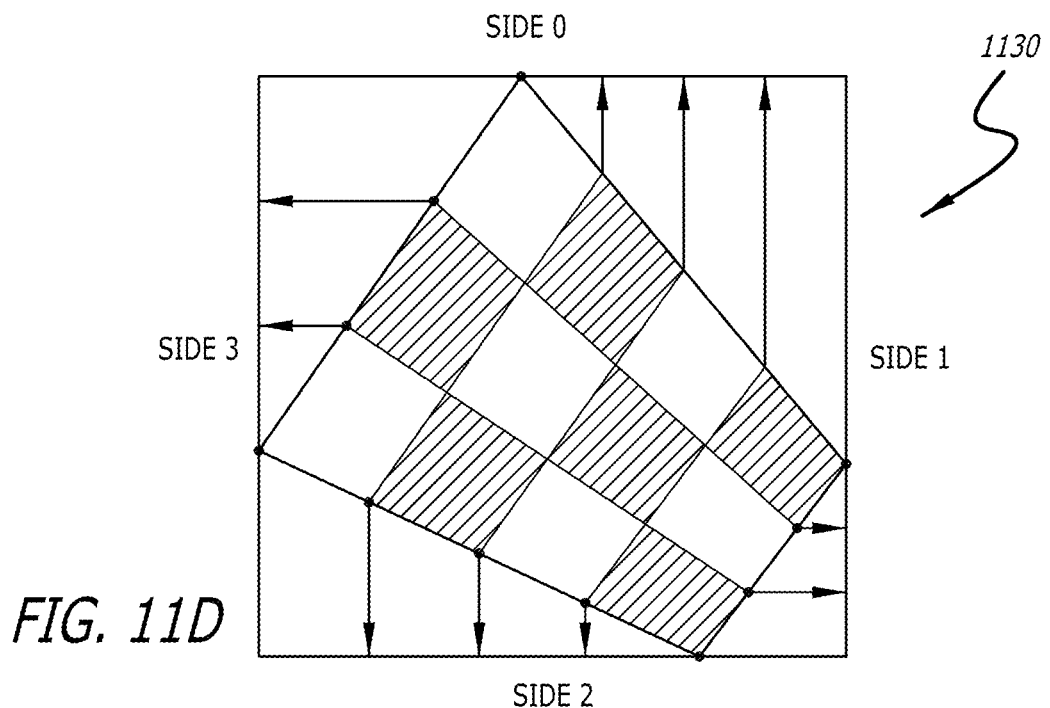

To make the determination of whether a chessboard has a diamond orientation, referring to graph 1130 of FIG. 11D, for a diamond orientation, there will be one point for each side of the chessboard whose distance is much closer to zero than all of the other points.

Figure 11E:
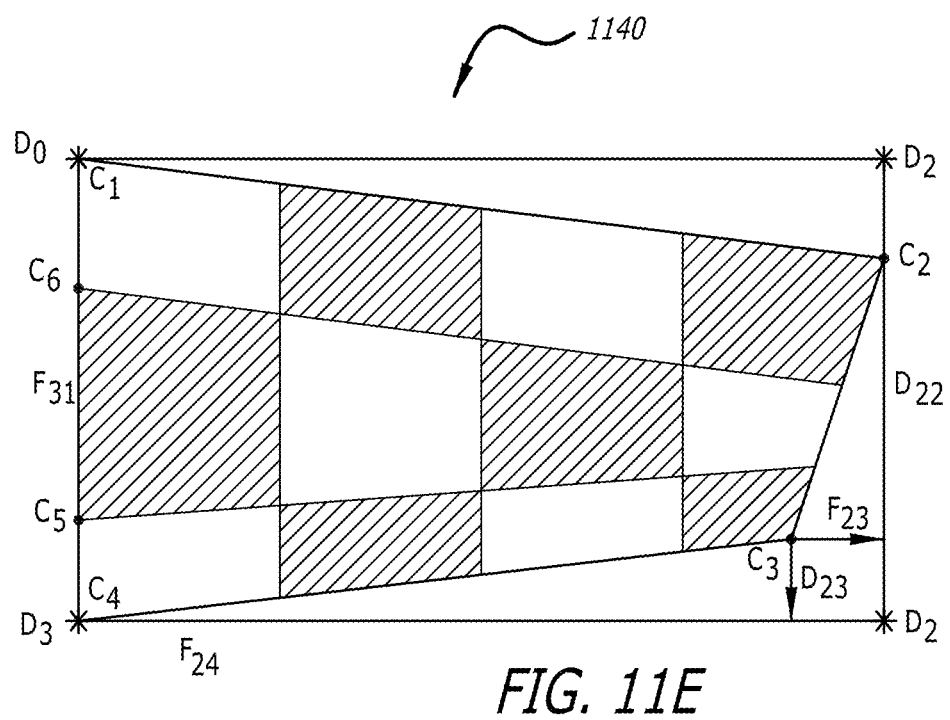

To make the determination of whether a chessboard has a rectangular orientation, referring to graph 1140 of FIG. 11E, for a rectangular orientation, the following scenario is possible. There are multiple issues using only the diamond orientation determination approach with the chessboard as oriented in FIG. 11E. First, for side $D_3$-$D_0$; $C_1$, $C_2$, $C_5$, and $C_6$ all lie at zero distance from the circumscribing side. Second, $C_4$ would be selected as the bounding corner for side $D_2$-$D_3$ instead of $C_3$.

Instead, all of the issues are resolved by computing the $F_{kL}$ distances:

For point $C_4$, $D_{24}$=0, but $F_{24}$>>$F_{23}$+$D_{23}$.
For point $C_2$, $F_{22}$=0, but $D_{22}$>>$F_{23}$+$D_{23}$.
Therefore, $C_3$ is selected as a bounding corner.
And, for $C_4$, $D_{34}$=$F_{34}$=0, and
for $C_1$, $C_5$, and $C_6$, $D_{3L}$=0, but $F_{3L}$>>0.
Therefore, $C_4$ is selected as a bounding corner.

After the pixel coordinates of the chessboard boundary points have been determined (Step 960 of FIG. 9), the chessboard is detected in the lidar dataset. FIG. 10 is a block diagram showing the disclosed method 1000 for auto-locating the chessboard in a lidar point cloud, in accordance with at least one embodiment of the present disclosure. At the start of this method 1000, a sliding window (with X percent overlap over the chessboard) is constructed (e.g., by processor 607 of FIG. 6) by building a buffer around the chessboard bounding corners (i.e. the chessboard boundary points found in Step 960) (Step 1005). Then, lidar points from the corresponding scan are projected onto the camera image using the initial guess of the calibration parameters (Step 1010). Then, while the full image is not covered, the sliding window is slid across the entire image starting at the lower left corner of the image and slid across the image until the sliding window reaches the upper right corner of the image (Step 1015). At each iteration of this procedure, the projected lidar points that fall within the sliding window, $L_{win}$, are determined (Step 1015).

Figure 12A:
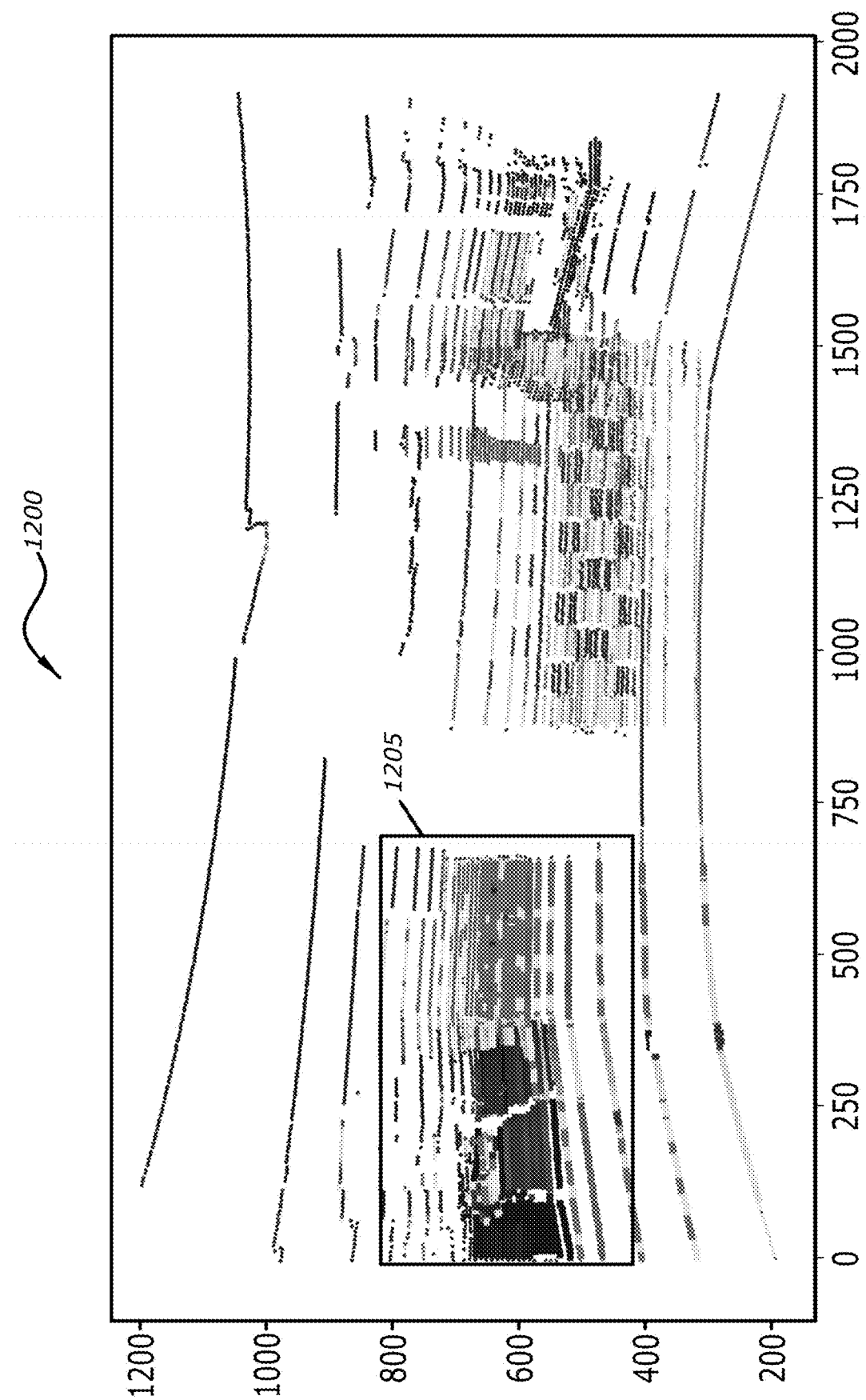
FIGS. 12A to 12C show graphs that illustrate a sliding window being slid across a collection of lidar points projected onto a camera image, in accordance with at least one embodiment of the present disclosure.
Figure 12B:
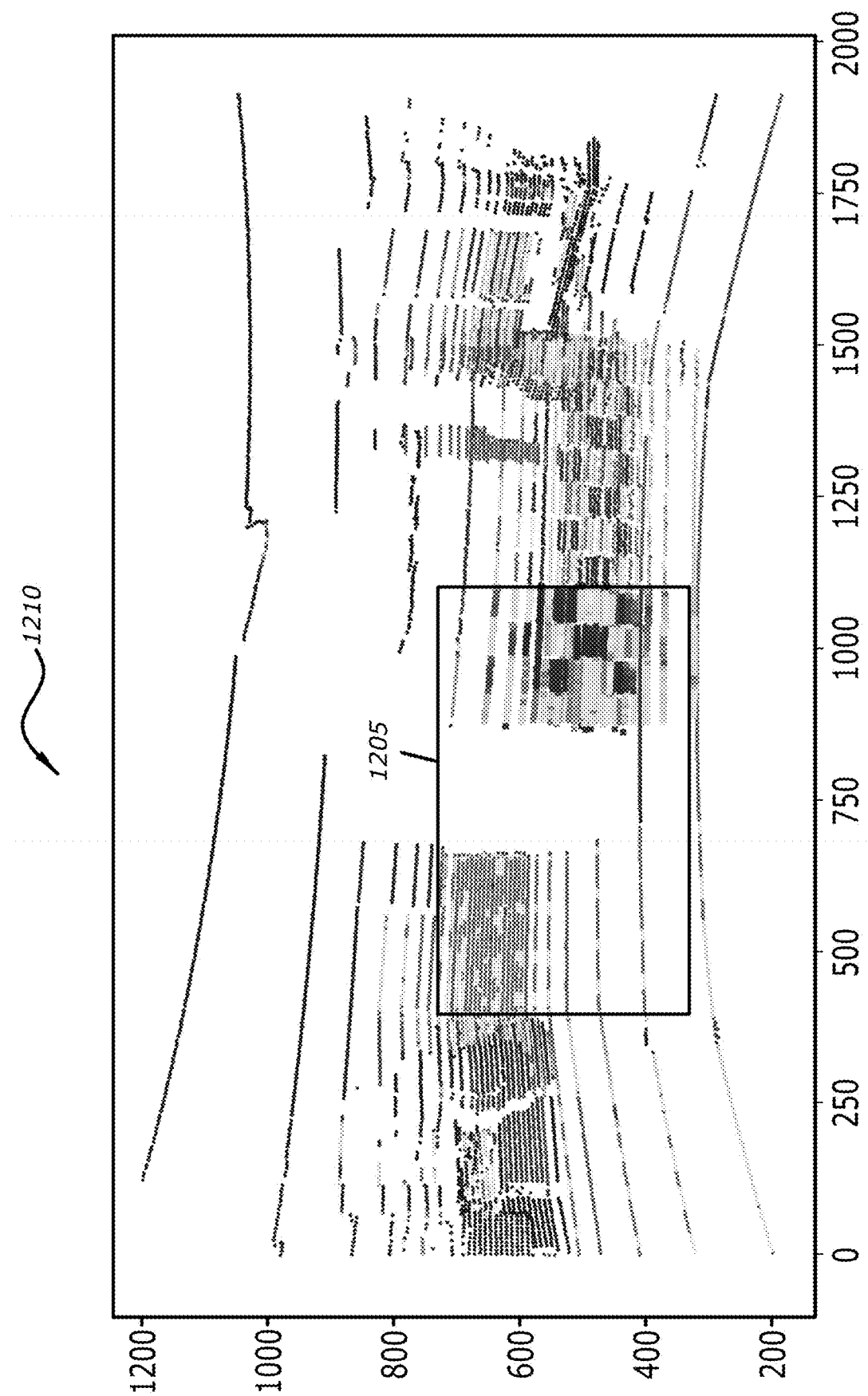
Figure 12C:
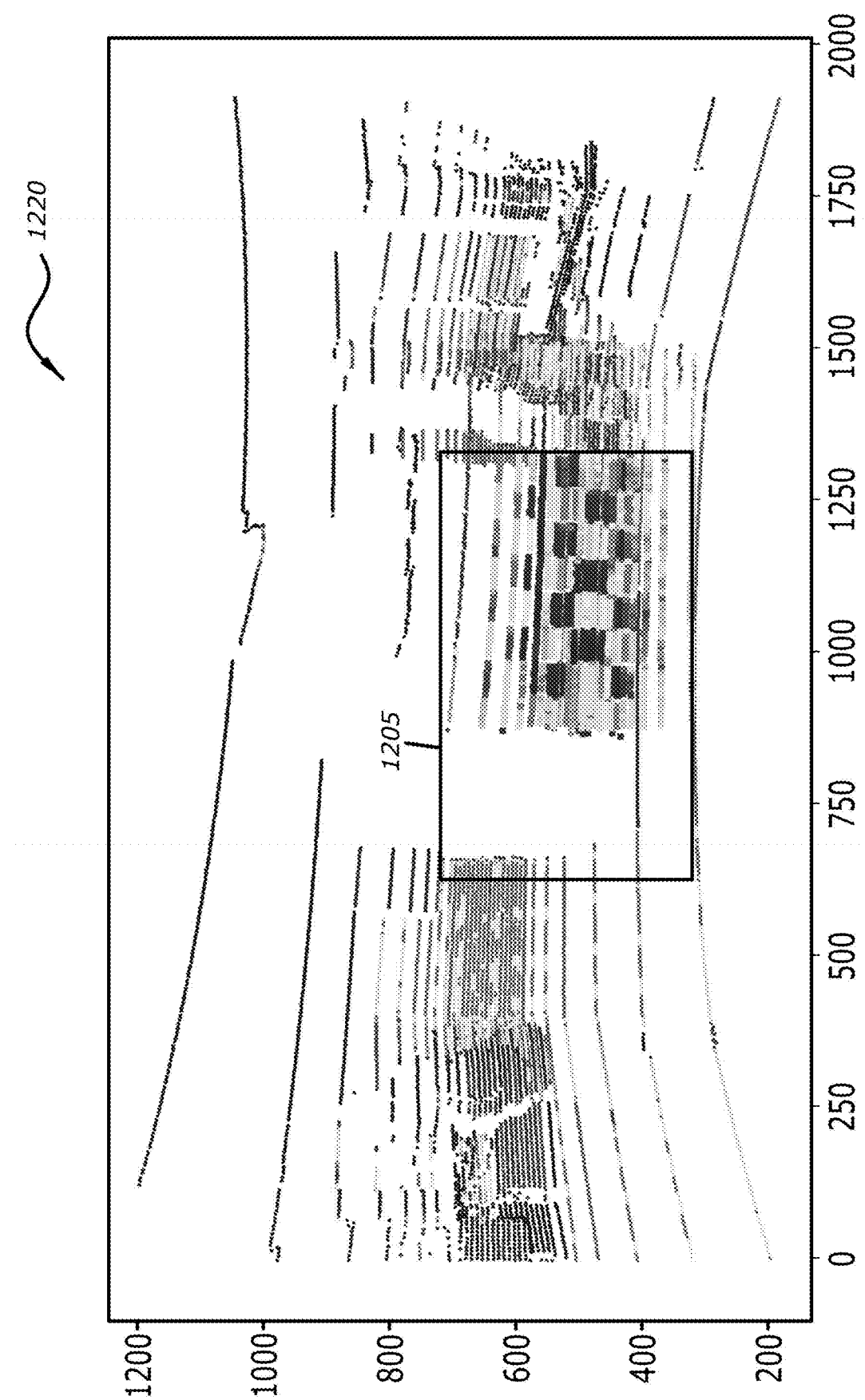

FIGS. 12A to 12C show graphs 1200, 1210, 1220 that illustrate a sliding window 1205 being slid across a collection of lidar points projected onto a camera image, in accordance with at least one embodiment of the present disclosure. In particular, the graph 1200 of FIG. 12A shows the sliding window 1205 located at a location of the image that does not contain the chessboard, graph 1210 of FIG. 12B shows the sliding window 1205 located at a location of the image that contains a portion of the chessboard, and graph 1230 of FIG. 12C shows the sliding window 1205 located at a location of the image that contains most of the chessboard.

Referring back to FIG. 10, then these points, $C_k$, k∈[0, N), are clustered (e.g., by processor 607 of FIG. 6) using a range metric, and the mean distance and size (i.e. the number of points) is computed (e.g., by processor 607 of FIG. 6) in each cluster (Step 1020). The reasoning is that within the sliding window, the chessboard will present as a large, foreground object. To this end, each cluster is ranked (e.g., by processor 607 of FIG. 6) by mean range (i.e. mean distance) (in ascending order, $R_d$) and by size (in descending order, $R_s$) (Step 1025). Then, the closest and largest cluster is selected (e.g., by processor 607 of FIG. 6) for further processing, $$C_{sel} = C_i, i = \underset{k}{\operatorname{argmin}} R_{dk} + R_{sk}. \qquad \text{(Step 1030)}$$

Then, the reflectivity outlier points are removed (e.g., by processor 607 of FIG. 6) from both the top and bottom of the scale and, afterwards, the points are classified (e.g., by processor 607 of FIG. 6) as black or white in the same manner shown in FIG. 8 (Step 1035). Then, the number of transitions (i.e. white to black or black to white) along both the image X-axis, $T_x$, and the image Y-axis, $T_y$, is computed (e.g., by processor 607 of FIG. 6) (Step 1040). From these transition values, two metrics ($T_{sum}$=$T_x$+$T_y$ and $T_{cnt}$=$T_{sum}$−|$T_x$−$T_y$|) are computed (e.g., by processor 607 of FIG. 6) (Step 1040). These metrics arise because we are searching for the alternating black/white pattern of the chessboard, meaning we simultaneously desire the largest number of transitions (since this is not generally a naturally occurring pattern) and a similar number of transitions in each axis (since the overall chessboard shape is rectangular).

Then, it is determined (e.g., by processor 607 of FIG. 6) whether both $T_{sum}$ and $T_{cnt}$ are greater (i.e. have higher transition scores) than the current best values (Step 1045). If it is determined that both $T_{sum}$ and $T_{cnt}$ are not greater than the current best values, then the method 1000 proceeds to Step 1015. However, if it is determined that both $T_{sum}$ and $T_{cnt}$ are not greater than the current best values, the current sliding window is selected as the best fit (Step 1050).

After the best fit sliding window has been determined (Step 1050), two global clustering steps are performed (e.g., by processor 607 of FIG. 6). These final steps are necessary because the initial estimate of the parameter values may provide a poor perspective match or the best fit sliding window may only contain part of the chessboard. To ensure that the full chessboard is identified, a range clustering step similar to the one outlined above, except over all the projected points, is performed (i.e. a clustering globally in range is performed) (Step 1055). Then a union over set combining all the clusters which share a point with the previously identified best fit is performed (Step 1060). Finally, we cluster in real 3D clustering in Euclidean distance ($\mathbb{R}^3$) (i.e. a clustering globally in $\mathbb{R}^3$ is performed) (Step 1065), and perform a similar union over set between the clusters and the previously identified best fit (Step 1070). The clustering results from these two operations are then merged (Step 1075). The output lidar points are contained in the merged clusters provided by these two operations.

FIGS. 13A and 13B together are a flow chart showing the disclosed method 1300 for calibration between a lidar sensor and a camera, in accordance with at least one embodiment of the present disclosure. At the start 1305 of the method 1300, a display displays a graphical user interface (GUI) 1310. Then, a parent directory is selected, via the GUI, for data curation 1315. A specific type of lidar sensor and a specific type of camera are then selected, via the GUI, for the calibration 1320. Then, optionally, intrinsic parameters for the camera are generated 1325. The camera intrinsic parameters are then loaded via the GUI 1330.

Then, a location of the camera with respect to the lidar sensor is measured 1335. At least one processor then determines translation parameters of extrinsic calibration parameters by using the location of the camera with respect to the lidar sensor 1340. Then, a target chessboard is oriented such that the target chessboard is aligned with at least two axes of a lidar coordinate system 1345. A camera then images the target chessboard to generate an initial image of the target chessboard 1350. Then, at least one processor optimizes a best fit transformation between a camera coordinate system and a target chessboard coordinate system 1355. At least one processor then determines a rotation matrix using the best fit transformation between the camera coordinate system and the target coordinate system 1360. Then, at least one processor extracts Euler angles of the extrinsic parameters from the rotation matrix 1365. The lidar sensor and the camera then collect calibration scenes using the target chessboard 1370. At least one processor then optimizes the extrinsic calibration parameters by using the calibration scenes 1375. Then, the method 1300 ends 1380.

FIG. 14 is a flow chart showing the disclosed method 1400 for collecting, by a lidar sensor and a camera, calibration scenes using a target chessboard, in accordance with at least one embodiment of the present disclosure. At the start 1410 of the method 1400, the lidar sensor transmits at least one transmit signal to a target chessboard located at N number of locations, where N is an integer, from the camera to obtain at least one lidar measurement 1420. The camera then images the target chessboard to generate imaging measurements of the target chessboard for each of the N number of locations 1430. Then, the method 1400 ends 1440.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method for calibration between a lidar sensor and a camera, the method comprising:
    determining, by at least one processor, translation parameters of extrinsic calibration parameters by using a location of the camera with respect to the lidar sensor;
    orienting a target chessboard such that the target chessboard is aligned with at least two axes of a lidar coordinate system;
    optimizing, by the at least one processor, a best fit transformation between a camera coordinate system and a target chessboard coordinate system;
    determining, by the at least one processor, a rotation matrix using the best fit transformation between the camera coordinate system and the target chessboard coordinate system;
    extracting, by the at least one processor, Euler angles of the extrinsic calibration parameters from the rotation matrix;
    collecting, by the lidar sensor and the camera, calibration scenes using the target chessboard; and
    optimizing, by the at least one processor, the extrinsic calibration parameters by using the calibration scenes.

2. The method of claim 1, wherein the method further comprises displaying, on a display, a graphical user interface.

3. The method of claim 2, wherein the method further comprises selecting, via the graphical user interface, a parent directory for data curation.

4. The method of claim 2, wherein the method further comprises selecting, via the graphical user interface, the lidar sensor and the camera for the calibration.

5. The method of claim 2, wherein the method further comprises loading, via the graphical user interface, camera intrinsic parameters.

6. The method of claim 1, wherein the method further comprises generating camera intrinsic parameters.

7. The method of claim 1, wherein the method further comprises measuring the location of the camera with respect to the lidar sensor.

8. The method of claim 1, wherein the method further comprises imaging, by the camera, the target chessboard to generate an initial image of the target chessboard.

9. The method of claim 1, wherein the optimizing, by the at least one processor, of the best fit transformation between a camera coordinate system and a target chessboard coordinate system is performed using a Levenberg-Marquardt optimization.

10. The method of claim 1, wherein the collecting, by the lidar sensor and the camera, the calibration scenes comprises:
    transmitting, by the lidar sensor, at least one transmit signal to the target chessboard located at N number of locations, where N is an integer, from the camera to obtain at least one lidar measurement; and
    imaging, by the camera, the target chessboard to generate imaging measurements of the target chessboard for each of the N number of locations.

11. The method of claim 10, wherein the at least one transmit signal is an optical signal or an infrared signal.

12. The method of claim 1, wherein the optimizing, by the at least one processor, of the extrinsic calibration parameters by using the calibration scenes is performed using a differential evolution optimization.

13. The method of claim 1, wherein the optimizing, by the at least one processor, of the extrinsic calibration parameters by using the calibration scenes comprises classifying lidar points and camera pixels as black or white.

14. The method of claim 1, wherein the optimizing, by the at least one processor, of the extrinsic calibration parameters by using the calibration scenes comprises determining an orientation of the target chessboard.

15. The method of claim 14, wherein the orientation of the chessboard is one of a diamond orientation or a rectangular orientation.

16. A system for calibration between a lidar sensor and a camera, the system comprising:
    a target chessboard;

at least one processor to determine translation parameters of extrinsic calibration parameters by using a location of the camera with respect to the lidar sensor, to optimize a best fit transformation between a camera coordinate system and a target chessboard coordinate system, to determine a rotation matrix using the best fit transformation between the camera coordinate system and the target chessboard coordinate system, to extract Euler angles of the extrinsic calibration parameters from the rotation matrix, and to optimize the extrinsic calibration parameters by using calibration scenes collected by the lidar sensor and the camera; and the lidar sensor and the camera to collect the calibration scenes using the target chessboard.

17. The system of claim 16, wherein the system further comprises a display to display a graphical user interface.

18. The system of claim 17, wherein the graphical user interface comprises a selection for a parent directory for data curation.

19. The system of claim 17, wherein the graphical user interface comprises a selection for the lidar sensor and a selection for the camera.

20. The system of claim 17, wherein the graphical user interface comprises a selection for loading camera intrinsic parameters.

\* \* \* \* \*